United States Patent
Daniel et al.

(10) Patent No.: US 9,838,264 B2
(45) Date of Patent: Dec. 5, 2017

(54) METHOD AND DIGITAL TOOL FOR ENGINEERING SOFTWARE ARCHITECTURES OF COMPLEX CYBER-PHYSICAL SYSTEMS OF DIFFERENT TECHNICAL DOMAINS

(71) Applicant: SIEMENS AKTIENGESELLSCHAFT, München (DE)

(72) Inventors: Donny Thomas Daniel, Unterhachching (DE); Carlos Morra, München (DE); Anjelika Votintseva, München (DE)

(73) Assignee: Siemens Aktiengesellschaft, München (DE)

( * ) Notice: Subject to any disclaimer, the term of this patent is extended or adjusted under 35 U.S.C. 154(b) by 266 days.

(21) Appl. No.: 14/428,566

(22) PCT Filed: Sep. 17, 2014

(86) PCT No.: PCT/EP2014/069812
§ 371 (c)(1),
(2) Date: Mar. 16, 2015

(87) PCT Pub. No.: WO2016/041594
PCT Pub. Date: Mar. 24, 2016

(65) Prior Publication Data
US 2016/0261466 A1 Sep. 8, 2016

(51) Int. Cl.
*G06F 9/44* (2006.01)
*H04L 12/24* (2006.01)
(Continued)

(52) U.S. Cl.
CPC .......... *H04L 41/145* (2013.01); *G06F 3/0484* (2013.01); *G06F 8/10* (2013.01);
(Continued)

(58) Field of Classification Search
CPC ....... H04L 41/145; G06F 3/0484; G06F 8/10; G06F 8/35; G06F 8/36; G06F 17/30294; G06F 17/30477; G06F 17/30958
(Continued)

(56) References Cited

U.S. PATENT DOCUMENTS 5,659,724 A * 8/1997 Borgida ............ G06F 17/30398
6,339,776 B2 * 1/2002 Dayani-Fard ............. G06F 8/74
(Continued)

OTHER PUBLICATIONS

Architecture Analysis & Design Language, pp. 1-3, http://en.wikipedia.org/wiki/AADL, Sep. 17, 2014.
(Continued)

*Primary Examiner* — Lewis A Bullock, Jr.
*Assistant Examiner* — Theodore Hebert
(74) *Attorney, Agent, or Firm* — Lempia Summerfield Katz LLC

(57) ABSTRACT

In order to engineer software architectures of complex cyber-physical systems of different technical domains such that both time and effort efficient and truly interactive engineering of software architectures of complex cyber-physical systems is enabled, it is proposed to provide an automatic enforcement of multi-level Constraints across architectural Views. This provides, (i) with regard to architectural aspects of such a complex cyber-physical system being captured in Views including various Entities being related to each other and entities being related across various Views and (ii) that these multi-view Constraints particularly implying that the Constraints placed on the Entities in one View may affect the validity of the relations of the Entities in another View, an error-free engineering, (e.g., without violating at least one Constraint), together with a rapid, in particular visual, feedback of Constraints being invalidated and Entities involved in the Constraints.

17 Claims, 21 Drawing Sheets

(51) Int. Cl.
G06F 3/0484 (2013.01)
G06F 17/30 (2006.01)
(52) U.S. Cl.
CPC ............... G06F 8/35 (2013.01); G06F 8/36 (2013.01); G06F 17/30294 (2013.01); G06F 17/30477 (2013.01); G06F 17/30958 (2013.01)
(58) Field of Classification Search
USPC ........................................................ 717/105
See application file for complete search history.

(56) References Cited

U.S. PATENT DOCUMENTS

| | | | | |
|---|---|---|---|---|
| 6,993,710 | B1* | 1/2006 | Coad | G06F 8/77 715/202 |
| 7,743,360 | B2* | 6/2010 | Venolia | G06F 8/20 717/103 |
| 8,805,875 | B1* | 8/2014 | Bawcom | G06F 17/30424 707/718 |
| 9,317,551 | B1* | 4/2016 | Zander | G06F 17/3041 |
| 2001/0042067 | A1* | 11/2001 | Dayani-Fard | G06F 8/74 |
| 2002/0023257 | A1* | 2/2002 | Charisius | G06F 8/20 717/106 |
| 2005/0021548 | A1* | 1/2005 | Bohannon | G06F 17/30914 |
| 2007/0011649 | A1* | 1/2007 | Venolia | G06F 8/20 717/101 |
| 2008/0148225 | A1* | 6/2008 | Sarkar | G06F 8/10 717/107 |
| 2009/0024590 | A1* | 1/2009 | Sturge | G06F 17/30893 |
| 2010/0070448 | A1* | 3/2010 | Omoigui | H01L 27/1463 706/47 |
| 2010/0094611 | A1* | 4/2010 | Sankaranarayanan | G01R 31/31835 703/22 |
| 2010/0211924 | A1* | 8/2010 | Begel | G06F 8/74 717/101 |
| 2010/0268722 | A1* | 10/2010 | Yalamanchi | G06F 17/30958 707/759 |
| 2011/0004587 | A1* | 1/2011 | Schambach | G06F 17/30997 707/706 |
| 2011/0040808 | A1* | 2/2011 | Joy | G06F 8/20 707/812 |
| 2012/0158639 | A1* | 6/2012 | Moore | G06F 17/30533 706/55 |
| 2012/0293542 | A1* | 11/2012 | Iwama | G06T 11/206 345/619 |
| 2013/0191372 | A1* | 7/2013 | Lee | G06F 17/30958 707/722 |
| 2013/0304439 | A1* | 11/2013 | Van der Velden | G06F 17/5009 703/6 |
| 2014/0067781 | A1* | 3/2014 | Wolchok | G06F 17/30392 707/701 |
| 2014/0278333 | A1* | 9/2014 | Gupta | H04L 41/145 703/18 |
| 2014/0280302 | A1* | 9/2014 | Morsi | G06F 17/30554 707/769 |
| 2014/0324393 | A1* | 10/2014 | Alfassi | G06F 17/5009 703/1 |
| 2015/0026158 | A1* | 1/2015 | Jin | G06F 17/30979 707/722 |
| 2015/0089646 | A1* | 3/2015 | Jeon | H04L 63/1475 726/23 |
| 2015/0100605 | A1* | 4/2015 | Golden | G06F 17/30958 707/798 |
| 2015/0149440 | A1* | 5/2015 | Bornea | G06F 17/30442 707/719 |
| 2015/0302300 | A1* | 10/2015 | Fletcher | G06N 5/04 706/11 |
| 2016/0261466 | A1* | 9/2016 | Daniel | G06F 8/10 |

OTHER PUBLICATIONS

Cyber-physical system, pp. 1-6, http://en.wikipedia.org/wiki/Cyber-physical_system, Sep. 17, 2014.

Software architecture, pp. 1-15, http://en.wikipedia.org/wiki/Software_architecture, Sep. 17, 2014.

* cited by examiner

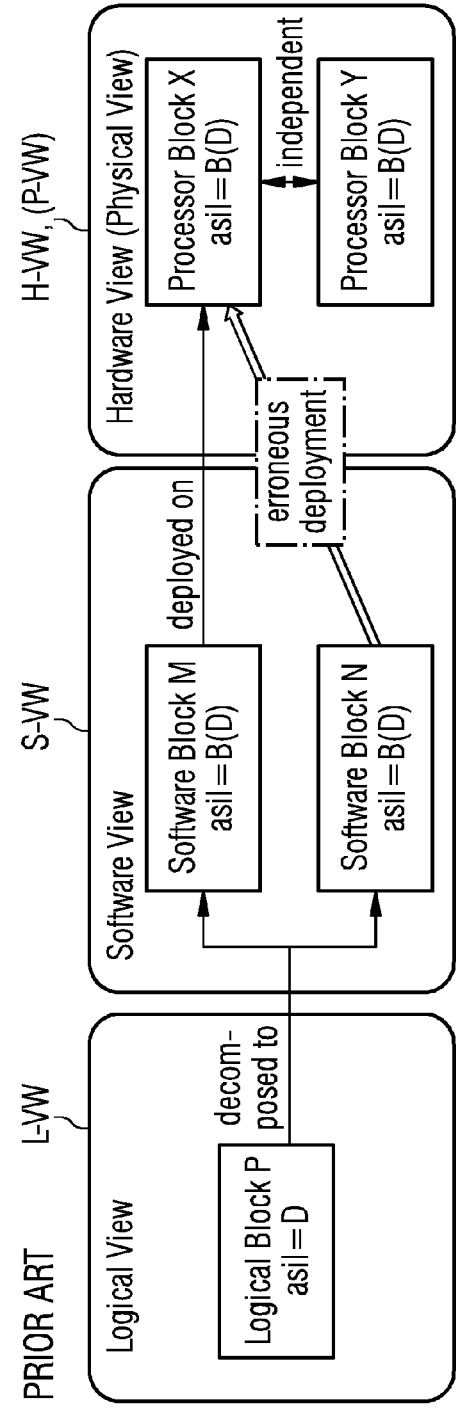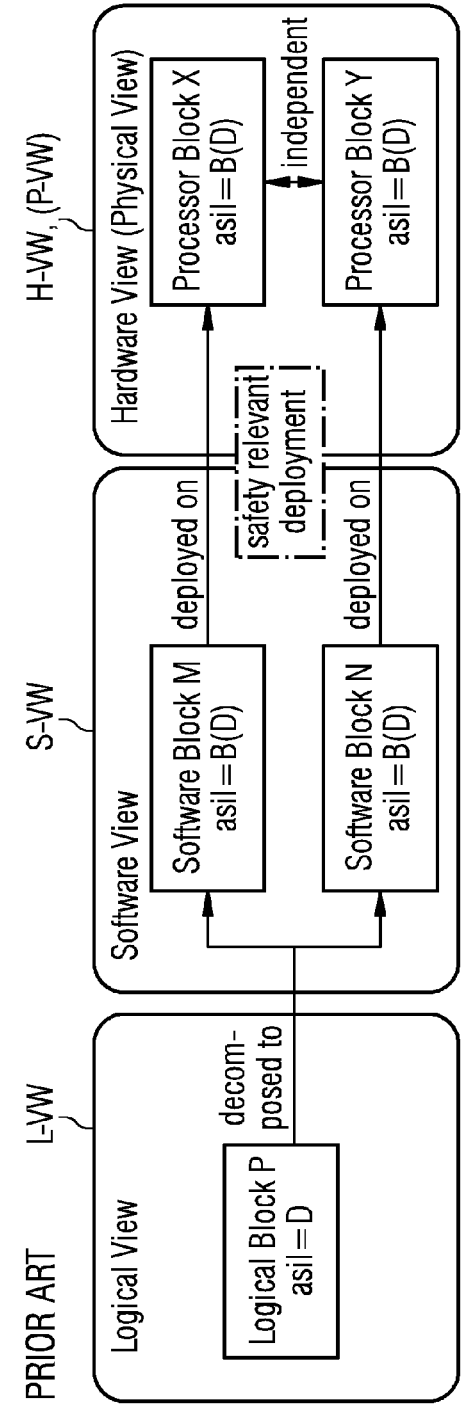

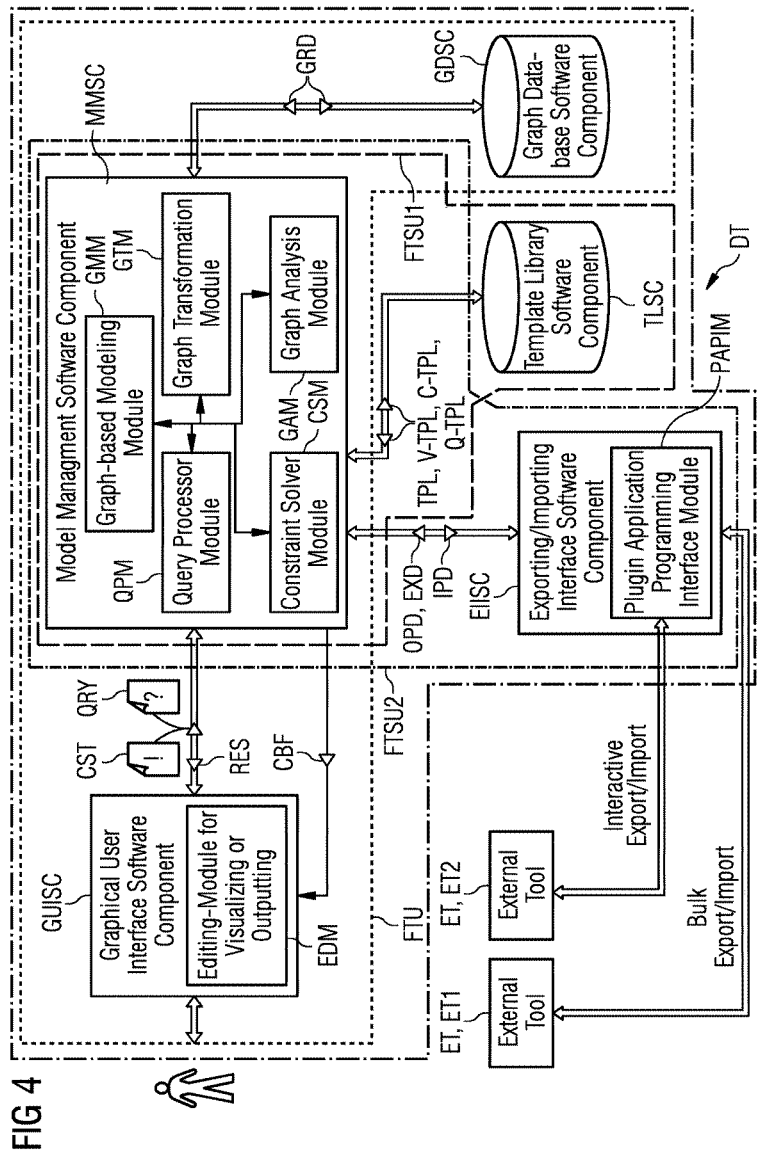

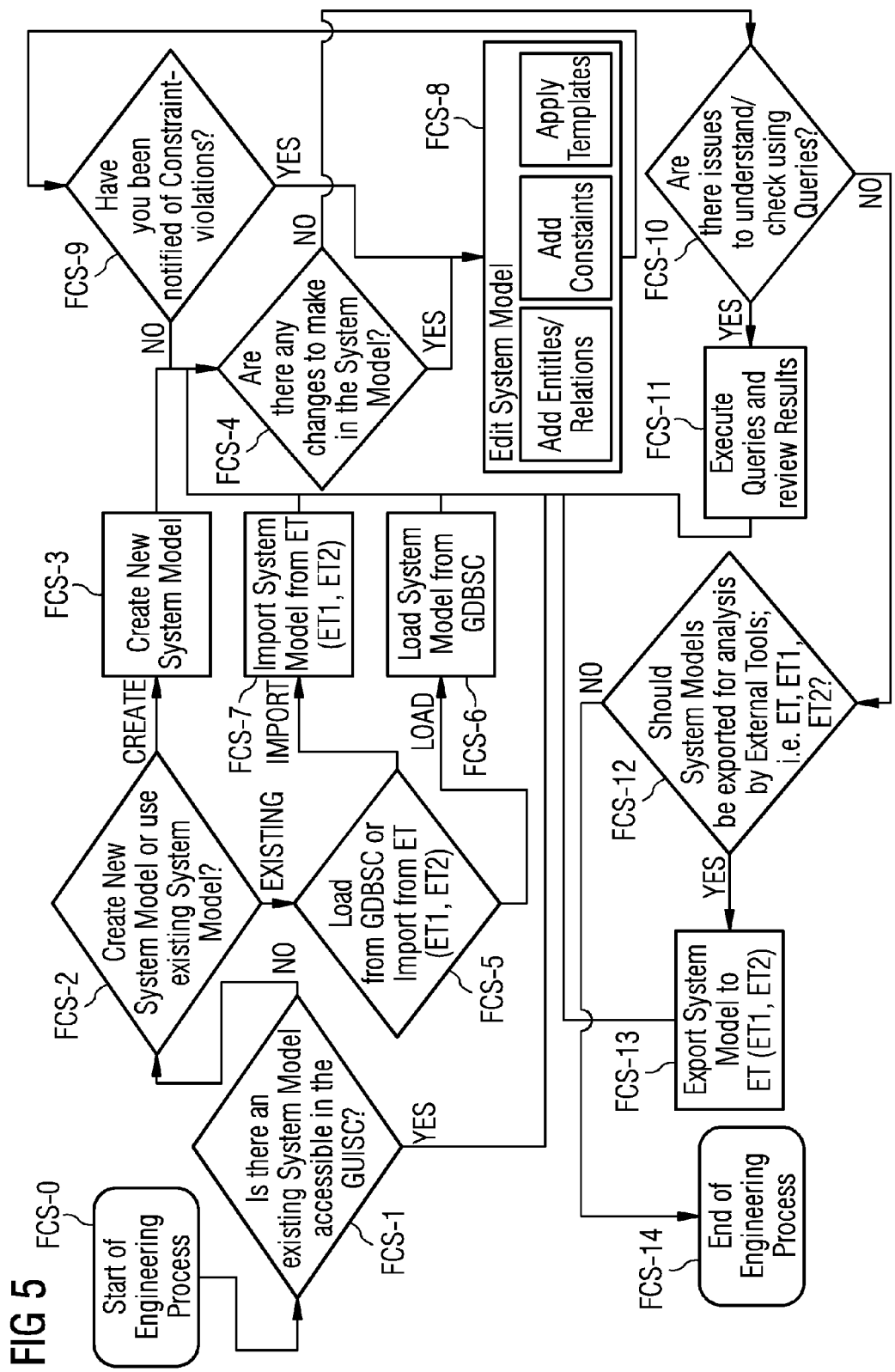

METHOD AND DIGITAL TOOL FOR ENGINEERING SOFTWARE ARCHITECTURES OF COMPLEX CYBER-PHYSICAL SYSTEMS OF DIFFERENT TECHNICAL DOMAINS

CROSS-REFERENCE TO RELATED APPLICATIONS

The present patent document is a §371 nationalization of PCT Application Serial Number PCT/EP2014/069812, filed Sep. 17, 2014, designating the United States, which is hereby incorporated by reference.

TECHNICAL FIELD

The embodiments relate to a method and digital tool for engineering or maintaining software architectures of complex cyber-physical systems of different technical domains.

BACKGROUND

The term "engineering" used in the following implicates all possible actions in the context of software architectures of complex cyber-physical systems used in different technical domains, such as the maintaining of software architecture of complex cyber-physical systems.

The term "cyber-physical system" used in the following refers to a system of collaborating computational elements controlling physical entities (cf. http://en.wikipedia.org/wiki/Cyber-physical_system in the version of Jul. 23, 2014), whereby the technical domains may be as diverse as areas like aerospace, automotive, chemical processes, civil infrastructure, energy, healthcare, manufacturing, transportation, entertainment, consumer appliances, etc.

The term "software architectures" used in the following refers to a high level structure of a software system, the discipline of creating such a high level structure, and the documentation of this structure (cf. http://en.wikipedia.org/wiki/Software_architecture in the version of Jul. 24, 2014). Thus, when in the following the term "software architectures" is used all software structures of complex cyber-physical systems of different technical domains may be covered.

The architectural aspects of a large and complex cyber-physical system may be captured in a large number of system models called "Views". Thus, when in the following the term "View" is used, the reader may have in mind that this term may replaced by the term "System Model" or the abridged term "Model" and vice versa, because both terms are synonymic. Views partition the system concerns into understandable chunks.

FIG. 1 depicts for example as prior art a Mechanical View M-VW, an Electronics View E-VW, a Functional View F-VW, and a Software View S-VW of such a complex cyber-physical system. According to the FIG. 1, a View VW include various Entities ENT, which are related to each other. The properties desired of the Entities are often modeled as Constraints, which are conditions that may be satisfied. Besides these intra-view Constraints (cf. the dashed lines in the FIG. 1) the Entities may also be related across various Views. In this case, we are talking about inter-view Constraints (cf. the solid lines in the FIG. 1). This implies, however, that the Constraints placed on the Entities in one View may affect the validity of the relations of the Entities in another View. It is a challenging task to make sure that these multi-view Constraints are never invalidated in the process of system engineering.

To better understand the problem, for example, the domain of safety integrity level analysis in the automotive domain is used.

In automotive engineering, the components of a system are assigned ASIL-numbers (Automotive Safety Integrity Level) to evaluate the risk of hazards posed by it. There are mandated, standard methods by which the ASIL-level of a combination of components is determined. This allows the architects to trace the ASIL-levels across the decomposition of the architecture of the system.

According to FIG. 2 as prior art, an example decomposition is as follows. Functional Views F-VWs of the architecture are derived from the requirements, which are then decomposed into constituent Logical Views L-VWs. The Logical Views L-VWs are then decomposed into Physical View P-VWs (Software Views and Hardware Views) depicting the actual physical components of the system.

Following the decomposition scenario according to the FIG. 2, in more detail, FIGS. 3A and 3B show as prior art two possible ASIL-decompositions with a violation of Safety-Constraints (FIG. 3A) and without a violation of Safety-Constraints (FIG. 3B). Considering a logical block P in the Logical View L-VW, if the logical block P is mandated to have the highest ASIL-level of D, it is allowed to be realized with redundant software implementation blocks having an ASIL-level of B(D). However, an ASIL-level of B(D) requires that the blocks may be functionally independent, that is, they do not affect the safety factors of each other.

What appears to be independent in the Software View S-VW of the system might erroneously be deployed on to the same processor in a Hardware View H-VW or the Physical View P-VW, thus violating the Constraint (cf. FIG. 3A). These efforts are to be considered to providing error-free system engineering (cf. FIG. 3B). Visual feedback of the Constraints being invalidated and the entities involved in the Constraints is also needed to make the system engineer's workflow more efficient.

With regard to such a method or tool for engineering or maintaining software architectures of complex cyber-physical systems of different technical domains, the following is provided.

Specialized tools for certain domains exist (e.g. Architecture Analysis & Design Language (AADL) is an architecture description language standardized by the Society of Automotive Engineers (SAE). AADL was first developed in the field of avionics (aerospace engineering) and was known formerly as the Avionics Architecture Description Language (cf. http://en.wikipedia.org/wiki/AADL in the version of Jun. 12, 2014), but are difficult to generalize, as well as don't offer support for automatic tracing or checking of multi-view Constraints. There are no tools that provide rapid visual feedback across architectural Views.

Thousands of Constraints need to be evaluated for a complex cyber-physical system. Yet, due to insufficient tool support for analyzing the architecture of a complex cyber-physical system, a majority of the safety analysis is done manually with office software like Excel and Word. Often only a single architectural decomposition is used to keep the scope of work tractable. Many person-hours of effort and review are used to provide that the evaluations are correct.

This situation results in very conservative design practices, as previously established architectures require less re-analysis. Design-space exploration (e.g. evaluating the realization of a requirement in hardware vs. software)

becomes very tedious. As a result, very conservative deployments may be attempted in order to keep the safety analysis manageable. Optimization synergies are also not fully exploited due to the same reason.

Safety certification is an expensive part of system development, the cost of which depends on efficient safety analysis. Dynamic system architectures offer the possibility of creating products that may meet the changing needs of customers. However they are not economically feasible without some way of decreasing re-certification expenses.

SUMMARY AND DESCRIPTION

The scope of the present invention is defined solely by the appended claims and is not affected to any degree by the statements within this summary. The present embodiments may obviate one or more of the drawbacks or limitations in the related art.

A method and a digital tool are proposed for engineering software architectures of complex cyber-physical systems of different technical domains, which enables both time and effort efficient and truly interactive engineering of software architectures of complex cyber-physical systems.

The embodiments include engineering software architectures of complex cyber physical systems of different technical domains is, regardless of whether it is a method or digital tool, to provide an at least semi-automatic enforcement of multi-level Constraints across architectural Views, thereby providing—with regard to architectural aspects of such a complex cyber-physical system being captured in Views including various Entities being related to each other and entities being related across various Views and that these multi-view Constraints particularly implying that the Constraints placed on the Entities in one View may affect the validity of the relations of the Entities in another View—an error-free engineering, e.g., without violating at least one Constraint, together with a rapid, in particular visual, feedback of Constraints being invalidated and Entities involved in the Constraints.

This is achieved by at least semi-automated Constraints checking across multiple Views of the complex cyber-physical systems thereby using, for example, a graph database backend to link elements from the different Views, providing a "Graph-Query-Language", generating dynamically Views, checking Constraints and visualizing or outputting Results. Alternatively, a graph-based modeling is used by modeling the Entities to be under analysis as Nodes and relations between the Entities as Edges, whereby to both the Nodes and the Edges either no attribute or at least one attribute is assigned, thereby mapping user input concepts into the Nodes and Edges with their attributes and storing modeled Graph Data. Properties desired of the Entities as Constraints are specified, such as "Conditions" or "Rules", having to be satisfied; At least one of at least one "System Model"-Request, at least one "modeled graph data"-Load Request, at least one Query and at least one Constraint for the graph-based modeling are input. The at least one Constraint is evaluated by transforming one graph into at least one other graph and using provided implementations of, in particular standard, graph algorithms. The at least one Query is processed against a current set of the stored Graph Data by using a "Graph-Query-Language". Inputted Constraints on a set of Nodes and Edges are evaluated, in particular repeatedly, against the current set of the stored Graph Data and providing on detecting Constraint-violations Callback Functions specifying locations of the Constraint-violations. Results are edited of at least one of the previous acts concerning the actions of modeling, specifying, inputting, evaluating or processing and the Callback Functions specifying the locations of the Constraint-violations for at least one of visualizing and outputting.

A Model Management Software Component, a Graphical User Interface Software Component, and a Graph Database Software Component forming a Functional Unit may be used, wherein a Graph-Based Modeling Module of the Model Management Software Component functionally associated with the Graphical User Interface Software Component and the Graph Database Software Component the Entities to be under analysis as Nodes and relations between the Entities as Edges are modeled, whereby to both the Nodes and the Edges either no attribute or at least one attribute is assigned, thereby mapping user input concepts into the Nodes and Edges with their attributes and modeled Graph Data are stored in the Graph Database Software Component. The Graph-Based Modeling Module properties desired of the Entities as Constraints, such as "Conditions" or "Rules", which have to be satisfied, are specified. The Graphical User Interface Software Component functionally associated with the Graph-Based Modeling Module at least one of at least one "System Model"-request, at least one "modeled Graph Data"-Load Request, at least one Query and at least one Constraint used by the Graph-Based Modeling Module for the graph-based modeling is inputted. A Graph Transformation Module and a Graph Analysis Module of the Model Management Software Component functionally associated with each the Graph-Based Modeling Module and the Graph Database Software Component the at least one Constraint is evaluated by transforming one graph into at least one other graph and using implementations of, in particular standard, graph algorithms provided by the Graph Analysis Module. A Query Processor Module of the Model Management Software Component functionally associated with each the Graph-Based Modeling Module and the Graph Database Software Component and using a "Graph-Query-Language" the at least one Query is processed against a current set of the Graph Data in the Graph Database Software Component. A Constraint Solver Module of the Model Management Software Component functionally associated with each the Graph-Based Modeling Module and the Graph Database Software Component the inputted Constraints on a set of nodes and edges, in particular repeatedly, are evaluated against the current set of the Graph Data in the Graph Database Software Component and on detecting Constraint-violations Callback Functions specifying locations of the Constraint-violations are provided. An Editing-Module of the Graphical User Interface Software Component functionally associated with each the Graph-Based Modeling Module, the Query Processor Module and the Constraint Solver Module Results of at least one of the previous actions concerning the modeling, evaluating, processing and the Callback Functions specifying locations of the Constraint-violations are edited for at least one of visualizing and outputting.

Constraints specified on the Views are of two types: "Conditions" and "Rules", whereby (i) Conditions are propositions whose value has to be maintained as true and (ii) Rules are user-supplied expressions that may have side effects on the related architectural views.

The term "Query" used in the following implicates all possible actions or input information in the context of engineering software architectures of complex cyber-physical systems used in different technical domains such as filtering information, sorting information, etc. as well as "System Model"-Requests, "modeled Graph Data"-Load Requests, etc.

The term "Result" used in the following includes with respect to actions concerning the modeling, evaluating, processing for example results corresponding to the Constraints and Queries and Models outputted by the Model Management Software Component, which may be based on modeled Graph Data.

Thus by the at least semi-automated (e.g., automated or semi-automated) checking of Constraints during the process of engineering or maintaining the software architectures of the complex cyber-physical systems and across multiple architectural levels of abstraction while providing intuitive, in particular visual, feedback the engineering/maintaining of expensive and sophisticated parts or aspects of the complex cyber-physical system, such as in particular safety certification, is optimized, improved and carried out efficiently.

Such a capability is not available in any commercially available tool today. This capability is realized via the following combination of features: (1) Graph-Based Modeling: It allows the user to focus on just the data pertinent to her solution without learning a new type system or meta-modeling system. Graph analysis and transformation support allows Queries and Constraints to be more powerful and efficiently implemented. (2) Graph Database: Using a graph database allows the efficient storage of large amounts of highly interlinked data. Only the specific subsets of the entire graph that are currently pertinent for analysis are loaded into memory. (3) Flexible Constraint Modeling: It allows for both "Conditions" (side-effect free) and "Rules" (with side-effects), gives the user the flexibility to express the requirements that the architecture has to satisfy succinctly. (4) Rapid, In Particular Visual, Feedback: This is made possible by having a visual representation of the Views/Models, as well as overlaying results of Constraint-violations and Queries on the same visual representation. This relieves the user of recreating the mental model in his mind and he may quickly focus on the problem areas.

The advantages are that the capability enables the following scenarios, making it possible to do both the time and effort efficient and truly interactive engineering of complex cyber-physical systems. (1) Dynamic visualizations are possible using user-defined Views, Templates, Constraints, Queries and filters that are applied across multiple architectural Views. (2) Faster design space exploration is possible as the Constraints get evaluated while editing, the impact of the changes are communicated immediately across Views, allowing for more efficient development, engineering and collaboration across disciplines. (3) Faster Re-Certification is possible since the impact of changes in the design may be evaluated automatically. This avoids conducting the certification process for components not affected by the change. (4) Designing for Dynamic Architectures, where the configuration of the system is changed after deployment. Modular system components may be automatically analyzed for global system effects since the Constraints may be automatically evaluated across Views/System Models. (5) Support for large systems: Using a graph database allows us to query for the relevant data while not loading the entire system data into memory for processing. This provides that very large and complex system architectures may be analyzed.

Of a sui generis design, the subject matter of the embodiments may be either a method or a digital tool, whereby the digital tool may be designed, in particular as an "Application Software (App)", to run on at least one of a computer and a server, whereby the computer may be a desktop PC or an "All-In-One" PC, a smartphone, a notebook, a tablet, etc. The digital tool may be stored on a storage media being insertable into the computer or the server or being part of the computer or the server. The digital tool may be downloadable or uploadable into the computer or the server. The digital tool may be stored as cloud-computing on at least one server.

In other words the digital tool may be a purpose-designed computer program product. The digital tool may be sold or distributed separately or in common with a complex cyber-physical-based durable or non-durable technical consumer product. So a technical consumer product may be for example a telecommunication appliance, a domestic appliance, a medical appliance, an industrial automation system, an energy supply system, a medical supply system, etc.

BRIEF DESCRIPTION OF THE DRAWINGS

FIG. 3A depicts an example of an ASIL-decomposition with a violation of Safety-Constraints.

FIG. 3B depicts an example of an ASIL-decomposition without a violation of Safety-Constraints.

FIG. 4 depicts a block diagram of a Digital Tool, in which the principal parts or functions of the tool are represented by blocks connected by lines that show the relationships of the blocks.

FIG. 5 depicts a Flow Chart with embedded use cases to engineer software architectures of complex cyber-physical systems using the Digital Tool according to the FIG. 4.

DETAILED DESCRIPTION

Figure 1:
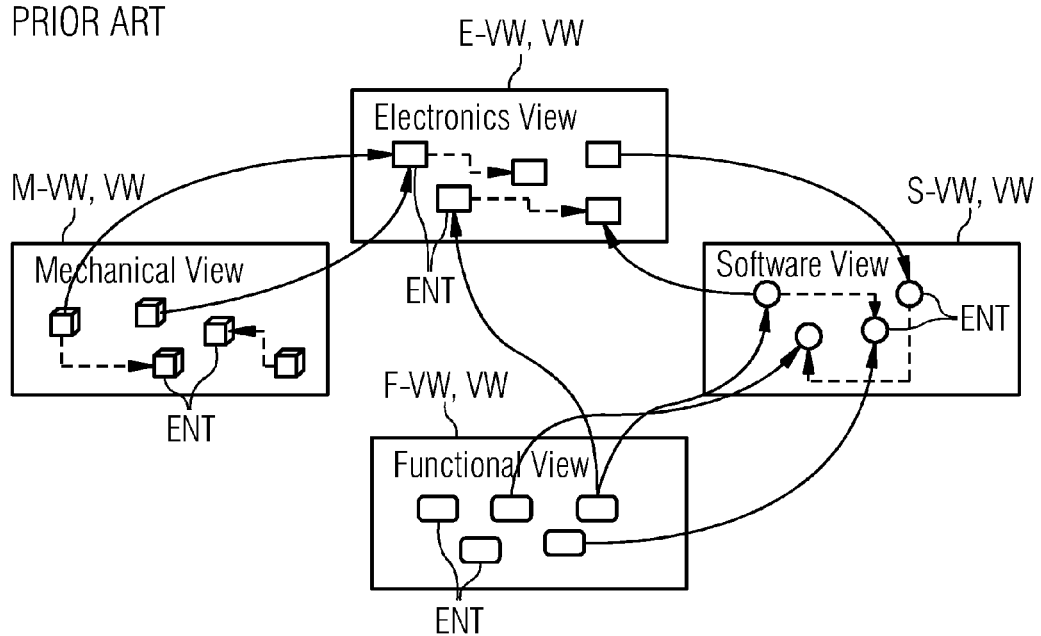
FIG. 1 depicts a Mechanical View M-VW, an Electronics View E-VW, a Functional View F-VW, and a Software View S-VW of an example of a complex cyber-physical system.
Figure 2:
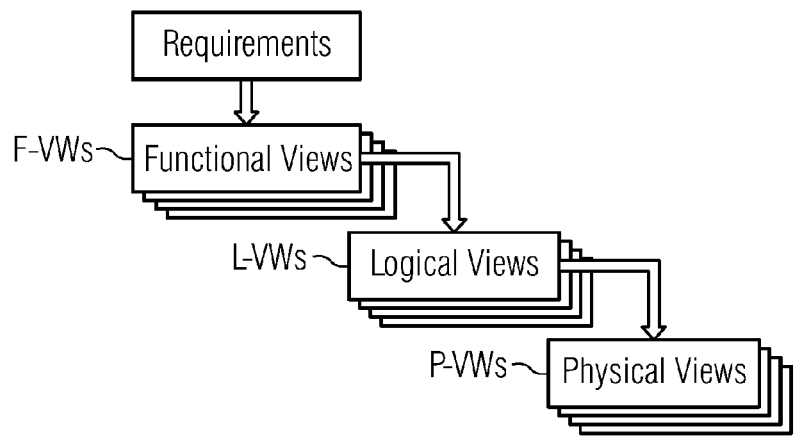
FIG. 2 depicts an example of a decomposition from Requirements to Physical Views P-VWs.

FIG. 4 depicts in a principle chart a Digital Tool DT that is interfaced to a user and two External Tools ET, from which may be used a first External Tool ET1 for Bulk Export/Import and a second External Tool ET2 for Interactive Export-Import. The Digital Tool DT may be designed as an "Application Software (APP)" including several "Software Components" and therein embedded various program modules henceforth referred to as "Modules". The "Application Software" is thereby configured for running on at least one of a computer and a server, whereby the computer may be a desktop PC or "All-in-One" PC, a smart phone, a notebook, a tablet etc. Furthermore the "Application Software" may be stored on a storage media being insertable into the computer or the server or being part of the computer respectively the server. Moreover, the "Application Software" may be down- or uploaded into the computer, respectively the server, or with respect to cloud computing stored on at least one server.

The External Tools ET, ET1, ET2 may be Digital Tools or hardware tools, such as a computer or server, so that the corresponding Export/Import-Functionality may be realized.

The Digital Tool DT designed as the "Application Software" or as a software tool includes for engineering software architectures of complex cyber-physical systems of different technical domains, in particular an automotive or telecommunication domain, a building or industrial automation domain, an healthcare domain or power supply domain etc., whereby the term "engineering" implicates also the maintaining of software architecture of complex cyber-physical systems, a Graphical User Interface Software Component GUISC, a Model Management Software Component MMSC and a Graph Database Software Component GDSC forming a Functional Unit FTU. The Model Management Software Component MMSC includes a Graph-based Modeling Module GMM, a Query Processor Module QPM, a Graph Transformation Module GTM, a Constraint Solver Module CSM and a Graph Analysis Module GAM that are functionally associated with each other within the Model Management Software Component MMSC.

With regard to the Functional Unit FTU the Model Management Software Component MMSC with the mentioned embedded Modules GMM, QPM, GTM, CSM and GAM are functionally associated with each the Graphical User Interface Software Component GUISC and the Graph Database Software Component GDSC. Later on regarding the description of FIGS. 5 to 12 it will be described which of the cited Modules of the Model Management Software Component MMSC will interact with other Software Components of the Digital Tool DT and how this interaction each looks like.

Based on the functional association between the Model Management Software Component MMSC and the Graphical User Interface Software Component GUISC at least one Constraint CST and at least one Query QRY are transferred from the Graphical User Interface Software Component GUISC to the Model Management Software Component MMSC. Conversely at least one of Results RES and Callback Functions CBF are transferred from the Model Management Software Component MMSC to the Graphical User Interface Software Component GUISC, e.g., for visualization or for outputting. For this purpose the Graphical User Interface Software Component GUISC includes an Editing-Module EDM for Visualizing or Outputting. The Results include for example results corresponding to the transferred Constraint CST and Query QRY and Models outputted by the Model Management Software Component MMSC, which may be based on modeled Graph Data.

Further based on the functional association between the Model Management Software Component MMSC and the Graph Database Software Component GDSC Graph Data GRD generated by the Model Management Software Component MMSC is stored in the Graph Database Software Component GDSC and in return the Graph Data GRD stored in the Graph Database Software Component GDSC may be loaded into the Model Management Software Component MMSC.

Besides the Functional Unit FTU, the Digital Tool DT includes a first Functional Sub-Unit FTSU1 formed by the Model Management Software Component MMSC with a Template Library Software Component TLSC and a second Functional Sub-Unit FTSU2 formed by the Model Management Software Component MMSC with an Exporting/Importing Interface Software Component EIISC. With respect to the first Functional Sub-Unit FTSU1, the Model Management Software Component MMSC is functionally associated with the Template Library Software Component TLSC. In this Template Library Software Component TLSC, various Templates TPL are stored. The Templates TPL include for instance View-Templates V-TPL, Constraint-Templates C-TPL and Query-Templates Q-TPL, which are all stored in the Template Library Software Component TLSC. The storing of the cited Templates TPL, V-TPL, C-TPL, Q-TPL and a "later on"-access on these Templates is done by the Model Management Software Component MMSC based on the functional association between the Model Management Software Component MMSC and the Template Library Software Component TLSC.

With respect to the second Functional Subunit FTSU2, the Model Management Software Component MMSC is functional associated with the Exporting/Importing Interface Software Component EIISC. Based on this functional association, the Model Management Software Component MMSC is able to export Input-Data IPD for external Analysis/Evaluation via the Exporting/Importing Interface Software Component EIISC to at least one of the Eternal Tools ET, in particular, the first External Tool ET1 for Bulk Export/Import and the second External Tool ET2 for Interactive Export/Import and to import Output-Data OPD of the external Analysis/Evaluation or External Data EXD via the Exporting/Importing Interface Software Component EIISC from the External Tool ET, in particular, the first External Tool ET1 for Bulk Export/Import and the second External Tool ET2 for Interactive Export/Import. For the Interactive Export/Import or for enabling an Exporting- and Importing-Functionality for interactive usage the Exporting/Importing Interface Software Component EIISC contains a "Plug-in Application Programming Interface Module" PAPIM.

Before describing based on a flow chart with embedded use cases (cf. FIGS. 5 to 12) how software architectures of complex cyber-physical systems are engineered using the above-described Digital Tool DT, it makes sense to look at the Model Management Software Component MMSC including the Graph-based Modeling Module GMM, the Query Processor Module QPM, the Graph Transformation Module GTM, the Constraint Solver Module CSM and the Graph Analysis Module GAM and their functionalities in more detail.

The main/substantial Module of the Model Management Software Component MMSC in the context of engineering software architectures of complex cyber-physical systems using the Digital Tool DT is the Graph-based Modeling Module GMM, whereby the other Modules mentioned above and embedded in the Model Management Software Component MMSC help the Graph-based Modeling Module GMM to accomplish its tasks.

A.) the Graph-Based Modeling Module:

Entities under analysis are modeled as Graph Nodes that have attributes. Relations between these Entities are modeled as Graph Edges that may also have attributes. One of the (mandatory) attributes is the type of the relationship (e.g. "dependency", "decomposition", "refinement", "trace", "connection", "data flow", etc.). The values of the Node or Edge attributes may be either directly given values or calculated based on other attributes. The Graph-based Modeling Module maps concepts from the user into Nodes and Edges and their attributes and stores modeled Graph Data in the Graph Database Software Component.

Constraint Modeling

Constraints specified on the System Model are of two types: "Conditions" and "Rules". "Conditions" are propositions whose value is to be maintained as true. These propositions specify some desired property of the architecture. For example, consider the condition: "all logical blocks should be decomposed to at least one physical block". This condition may be used by the GUI to show a list of logical blocks for which there are no physical block mappings. It is possible to specify multi-level constraints that work across architectural views. "Rules" are user-supplied expressions that may have side effects on the related architectural Views. A "Rule" specified on a Node may be used to update attributes of related Nodes, even if they are in another View. "Rules" may also be used to signal the user interface to trigger user input with a specified set of choices, as well as guide the user's attention to potential inconsistencies. An example of a "Rule" may be: "On new physical block, prompt user to enter which logical block the new block maps to".

Now, on addition of a new physical block, the Digital Tool will prompt the user for the relevant logical block, or may auto-insert a logical block as a convenience option.

The validity of the System Model under consideration is provided by Graph-based Modeling Module. Constraints are re-evaluated whenever Entities are added to an architectural View. Since "Rules" may have side effects, this may imply that the addition of an entity in View A, may cause the addition of related entities in related View B (or even in the same view itself). This in turn, triggers the relevant Constraints in B to be evaluated subsequently after the "Rule" is completed.

A.1) The Graph Transformation Module:

This Module takes care of transforming one graph into one or more other graphs. Common graph transformations include extracting sub-graphs based on property values and finding the transitive closure of Node-relations. This aspect is needed for the efficient and user-friendly implementations of certain analyses and visualizations.

A.2) The Graph Analysis Module:

This Module provides implementations of graph algorithms that may be used to evaluate Queries and Constraints. Common analysis methods include Node-clustering, Node-ranking and Node-finding with minimal spanning trees.

A.3) The Query Processor Module:

This Module takes user Queries and evaluates them over the current set of data in the Graph Database Software Component, returning the relevant results. The Query-language allows specifying filters and collection operations like sorting. The Query Processor Module may use the Graph Transformation Module to process the results into a format required for visualizing or outputting the Results at the Graphical User Interface Software Component using the Interface-internal Editing-Module.

A.4) The Constraint Solver Module:

This Module takes Constraints given by the user on a set of Nodes and Edges and, e.g., repeatedly evaluates against the current data. On detection of conflicts, it provides Callback Functions that may be used by the Graphical User Interface Software Component using the Interface-internal Editing-Module to visualize or output the location of the Constraint-violations.

B.) the Graph Database Software Component for Native Persistence of Graph Data or Graphs:

This Component is able to store and indexed Graph Data in a custom format that makes graph operations very efficient. The usage of this special Database-Format allows the solution to be generally applicable, as many Data Models may be represented as a set of Nodes and relations between them.

C.) the Exporting/Importing Interface Software Component:

This extensible Component manages interfaces with External Tools. This is important as certain specialized analyses like Finite Element Analysis have mature tools that do not need to be re-implemented. However, it is necessary to aggregate the results of such tools with the Entities in the Graph Database Software Component so that Queries and Constraints on them may be evaluated.

C.1) The "Plug-in Application Programming Interface Module":

The additional Module provided for External Tools that desire interactive usage of the data in the Digital Tool.

D.) the Template Library Software Component:

Enabling the reuse of common Queries, Constraints and architectural Views is important for high productivity. A solution to this aspect is to support the definition of Templates, which are parameterized versions of an actual View, Constraint or Query that would be created by the user.

Three types of Templates may be designed. (i) View-Templates: Include a graph-based description of what the elements to be visualized are, and what the relations are between them. In addition, it also describes how to layout and interact with these elements. (ii) Constraint-Templates: These may be expressions that contain variables. The variables may be substituted with the actual data in the Graph Database Software Component to reuse the Constraint-structure. (iii) Query-Templates: These may be expressions that contain variables. The variables may be substituted with the actual Graph Data in the Graph Database Software Component to reuse the Query-structure.

This Component allows the storage and retrieval of such Template-definitions by the Graph-based Modeling Module, and in turn may be presented for selection the user via the Graphical User Interface Software Component. The Template Library Software Component allows domain-specific information to be re-used, as each user need not recreate all the properties of the Nodes and relations relevant to the particular discipline. For example, a project in a Building Automation Industry would use a different set of Templates compared to one in a Healthcare domain.

E.) the Graphical User Interface Software Component:

This Component of the Digital Tool presents the Graph Data in terms of the architecture Views currently being analyzed by the user. Multiple Views are juxtaposed to help the architect understand the relationships and the impact of changes in a View. Graph analysis methods like Node-clustering and Node-ranking are used to understand properties of the Views being presented.

The user may also add new Constraints to be evaluated on existing Graph Data. Any violations will be reported via Callbacks Functions into the Graphical User Interface Software Component using the Interface-internal Editing-Module that may prompt the user for additional input, or visually indicate where in the View the violations take place.

Exploration of various aspects of the architecture Views may be done by user Queries (e.g. filtering and sorting). The results are displayed graphically to allow more intuitive understanding.

Figure 14:
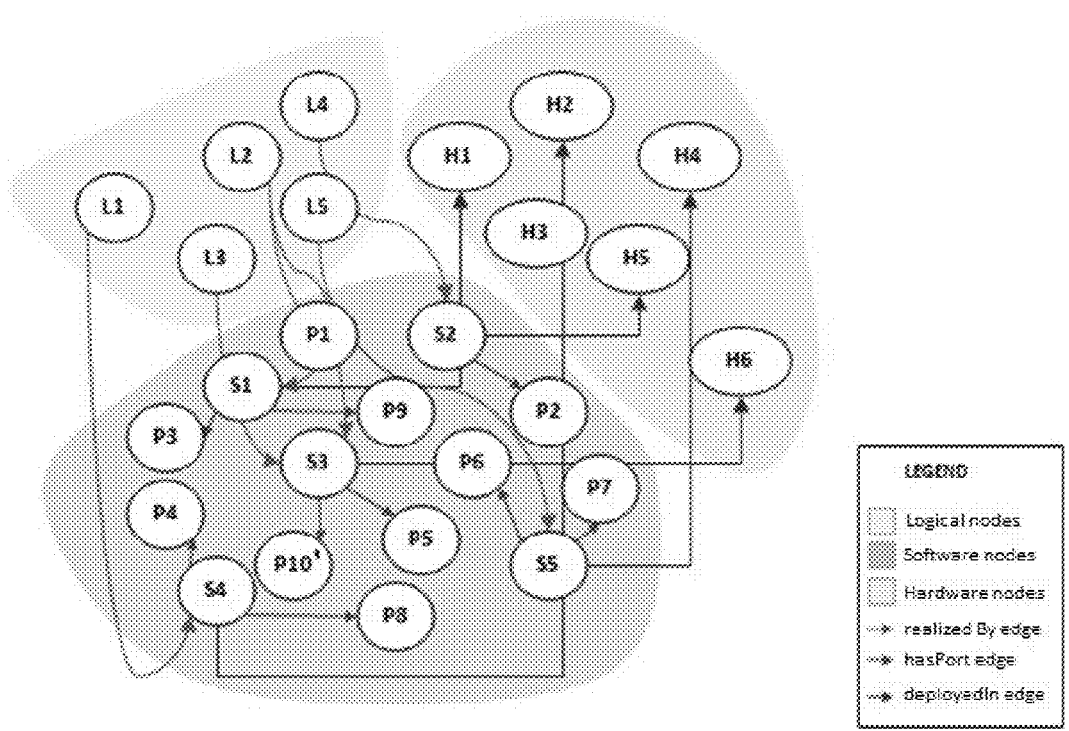
FIG. 14 depicts Nodes and Edges of an example graph representation of architectural information.

F.) Example of Graph Data Representation:

FIG. 14 depicts Nodes and Edges of a graph representation of architectural information. Each architectural Entity is modeled as a Graph Node with a unique identifier. A Node is represented by an ellipse that encloses the identifier. Edges between Nodes are colored according to the relations being represented to visually discern the different relations. Similar Nodes are grouped together to emphasize that different types may be modeled. The legend describes the visual encoding.

This example illustrates the following concepts:

There is a natural encoding of architectural information in a graph representation. The above representation may be directly entered into a suitable graph database allowing storage of large system graphs. The raw Graph Data is not in a suitable format for human understanding, and hence we require higher level operations to convert it into diagrams familiar to architects.

Figure 15:
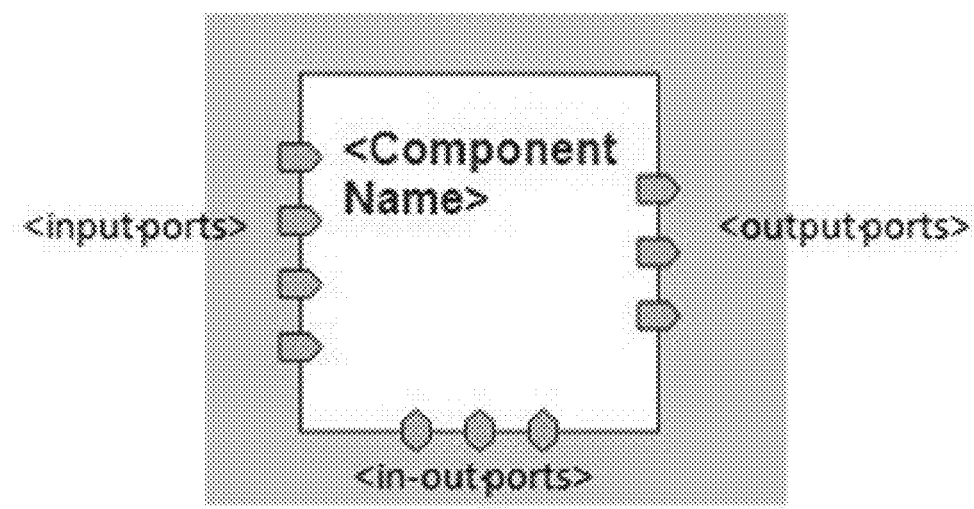
FIG. 15 depicts an example of a View-Template for a simple component and connector diagram.

G.) Example of a View-Template:

FIG. 15 depicts a View-Template for a simple component and connector diagram. The View-Template information is summarized in TABLE 1. The variables are prefixed with a '$'-sign:

TABLE 1

Graph Entities of a View-Template

| Types | Component |  |
| --- | --- | --- |
|  | Port |  |
| Relations | hasOutput(•$Component,•$Port) | $Component•has•an•output•port•$Port |
|  | hasinput•(•$Component,•$Port) | $Component•has•an•input•port•$Port |
|  | hasinOut•(•$Component,•$Port) | $Component•has•a•port•$Port•that•can•act•as•both•an•input•and•output•port. |
|  | flow•(•$Port1,•$Port2) | There•is•a•connection•between•$Port1•and•$Port2 |
|  | dependsOn•($Component2,•$Component1) | $Component1•provides•input•to•$Component2 |
| Layout | Directed•Acylic•graph•from•right•to•left•based•on•the•relation•'dependsOn' |  |

Figure 16:
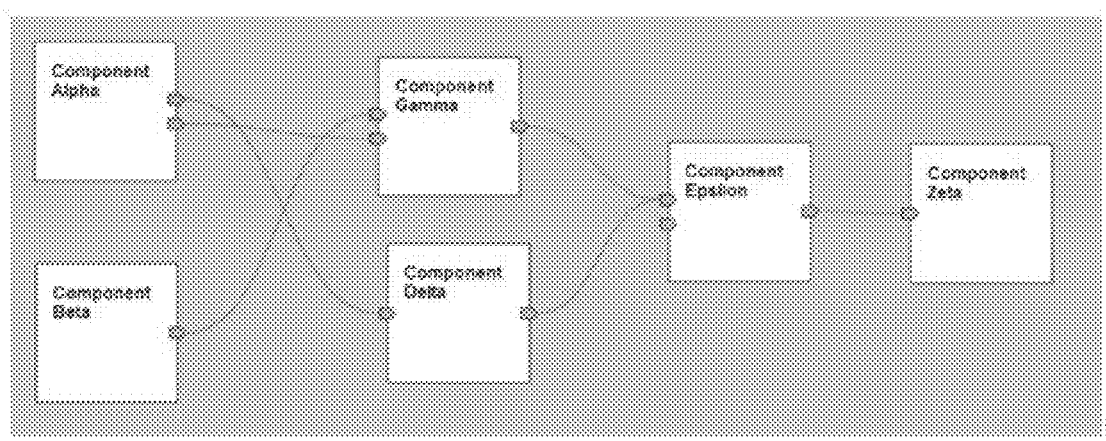
FIG. 16 depicts an example of a View-Template filled with sample data.

An example of the above View-Template filled with sample data is depicted in FIG. 16.

H.) Example of Constraint-Template:

The following is just an example language that may be used for Constraint-definition:

EnsureUniquePortInput($ID, $PID):=Component('id: $ID').Port('SPID')inputs<=1

It defines a constraint, EnsureUniquePortInput that takes two inputs: (i) SID: the identifier of a component, and (ii) SPID: the identifier of a port.

Figure 17:
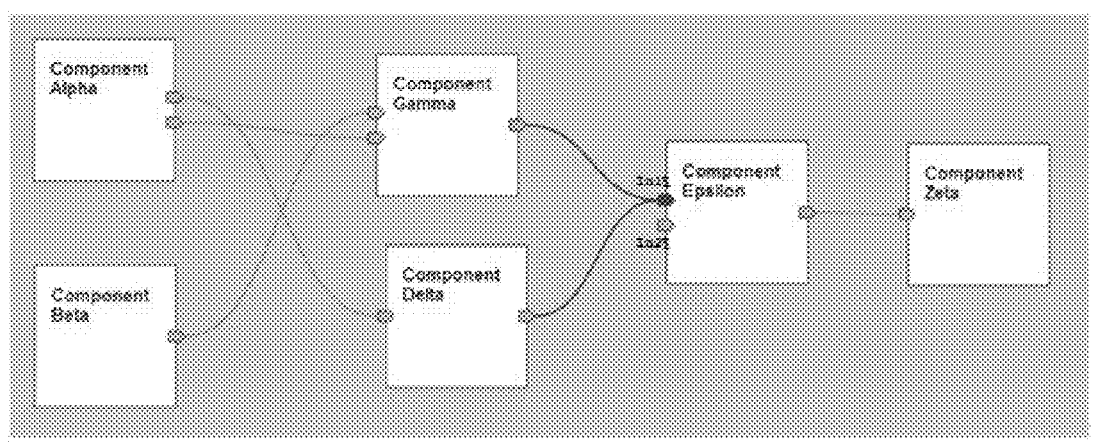
FIG. 17 depicts an example of an Interface-internal Editing-Module to highlight the violation.

When the expression is evaluated, the given port of the component is checked for more than one input. A list of violations is prepared, and the results may be used by the Graphical User Interface Software Component using the Interface-internal Editing-Module to highlight the violation as depicted in FIG. 17, Example Visualization of Evaluation of Constraint: Evaluated Constraint: EnsureUniquePortInput ('Epsilon', 'In1').

I.) Example of Advanced Constraints Across Multiple Views:

This example will illustrate how system level constraints may be set up using the Digital Tool and how it may provide continuous validation across Views/disciplines. The example will focus on the impact of the electrical and hydraulic View configurations on the deployment of software on a cloud datacenter. The datacenter has several servers where software applications are deployed. Each server has specific cooling requirements and power requirements.

The datacenter from our example include three servers to which three applications are deployed. The servers are powered by an Uninterrupted Power Supply (UPS) that is normally powered by grid power. In case of power outage, a battery acts as an emergency power source. The servers are cooled with a water-based cooling mechanism, which allows the servers to perform at peak loads. The following is a "System Level"-View that depicts an overview of the architectural elements.

Figure 18:
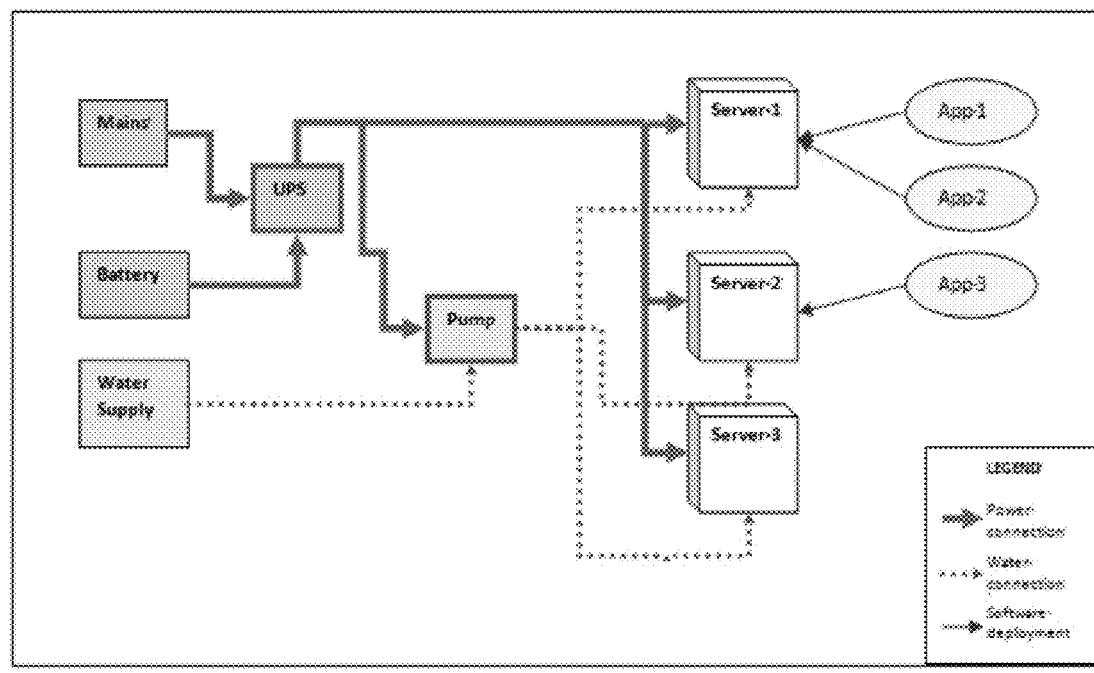
FIG. 18 depicts an example of an overview of a cloud datacenter system.

FIG. 18 depicts an overview of the cloud datacenter system, which may be broken down into multiple View-Points, with Constraints affecting each View-Point.

I.1) Electrical View

Figure 19:
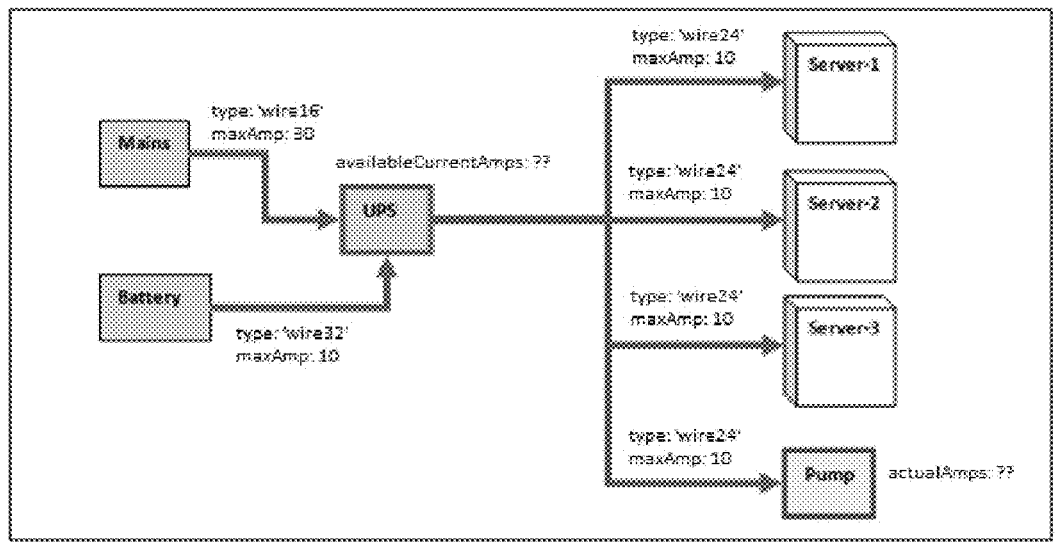
FIG. 19 depicts an example of an electrical view of a cloud datacenter system.

FIG. 19 depicts an electrical view of the cloud datacenter system.

The different Nodes in the electrical View are the Entities that require or generate electrical power. The Edges are annotated with properties that signify their electrical characteristics like maximum capacity in amperes (maxAmp).

One may define a dynamically calculated attributes for the UPS-Node using an example scripting language as follows:

```
ups:   = graph.findNodeByID('UPS')
m:     = graph.findNodeByID('Grid power')
b:     = graph.findNodeByID('Battery')
ups.hasMains:    = it.inputVertices.contains(m)//true or false
ups.hasBatt:   = it.inputVertices.contains(b)//true or false
ups.availableCurrentAmps: =
- it.hasMains --> 30
- it.hasBatt   --> 10
- 0
```

The above script assumes the existence of predefined functions: (i) 'inputVertices' that returns the list of vertices connected to a Node; (ii) 'contains' returns true or false if the given identifier is present in the array; (iii) 'it' is a self-reference to the node when evaluating the expression on the graph.

Similar to 'availableCurrentAmps', one may think of an attribute 'actualAmps' for the Pump-Node that may calculate the actual current expected to reach the pump based on the load connected to the Uninterrupted Power Supply (UPS).

I.2) Hydraulic View

Figure 20:
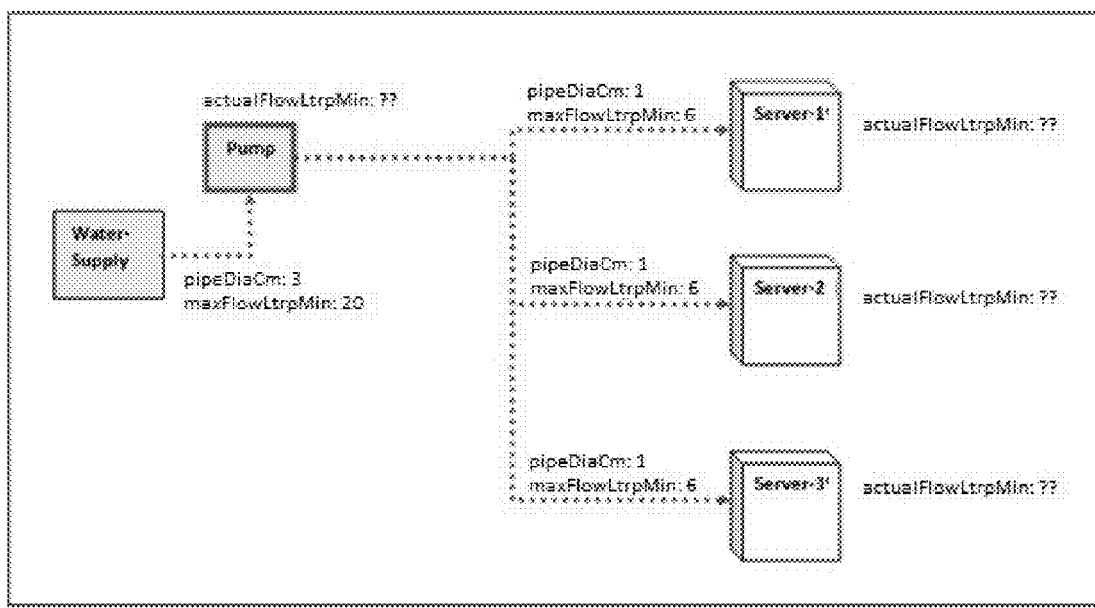
FIG. 20 depicts an example of a hydraulic view of a cloud datacenter system.

FIG. 20 depicts a hydraulic view of the cloud datacenter system. This View gives more details regarding the cooling system of the datacenter.

Here, again, there are specific properties related to hydraulic concerns such as the diameter (in cms) of the pipe for connection (pipeDiaCm), and the maximum rate of water flow in liters per minute (maxFlowLtrpMin).

It may be defined the actual rate give by the pump as a function of the power it receives, as the following script example shows:

```
pump:                   = graph.findNodeByID('Pump')
pump.actualFlowLtrpMin: = case(it.actualAmps as x) {
x > 10         --> 18
5 < x < 10     --> 12
x < 5          --> 8
x < 3          --> 0
}
```

This provides that it may be calculated an attribute relevant to the hydraulics View ('actualFlowLtrpMin') based on an attribute pertinent to the electrical view (Recall that 'actualAmps' was defined in the previous view).

Similarly, the 'actualFlowLtrpMin' of each server may be calculated as a function of the hydraulic load on the pump.

I.3) Performance Constraints:

Now defining performance Constraints based on the cooling available to a server may be considered. Assuming a value from 0-100 defines a performance measure, the following script gives an example:

```
servers:              = graph.findNodeByType('server')
servers.performance:= case( it.actualFlowLtrpMin as x) {
x > = 6            --> 100
3 < = x < 6        --> 50
x < 3              --> 10
}
```

I.4) Deployment Configurations:

Now the implications the above inter-view relations have on the deployment View may be looked at. A desired configuration is that one server is to be reserved as a hot standby, in case of failure of the primary servers. In our example, it is considered that Server 3 to be the hot standby.

One may think of two states the datacenter is going to be in (i) Powered by the grid or (ii) Powered by the battery.

Figure 21:
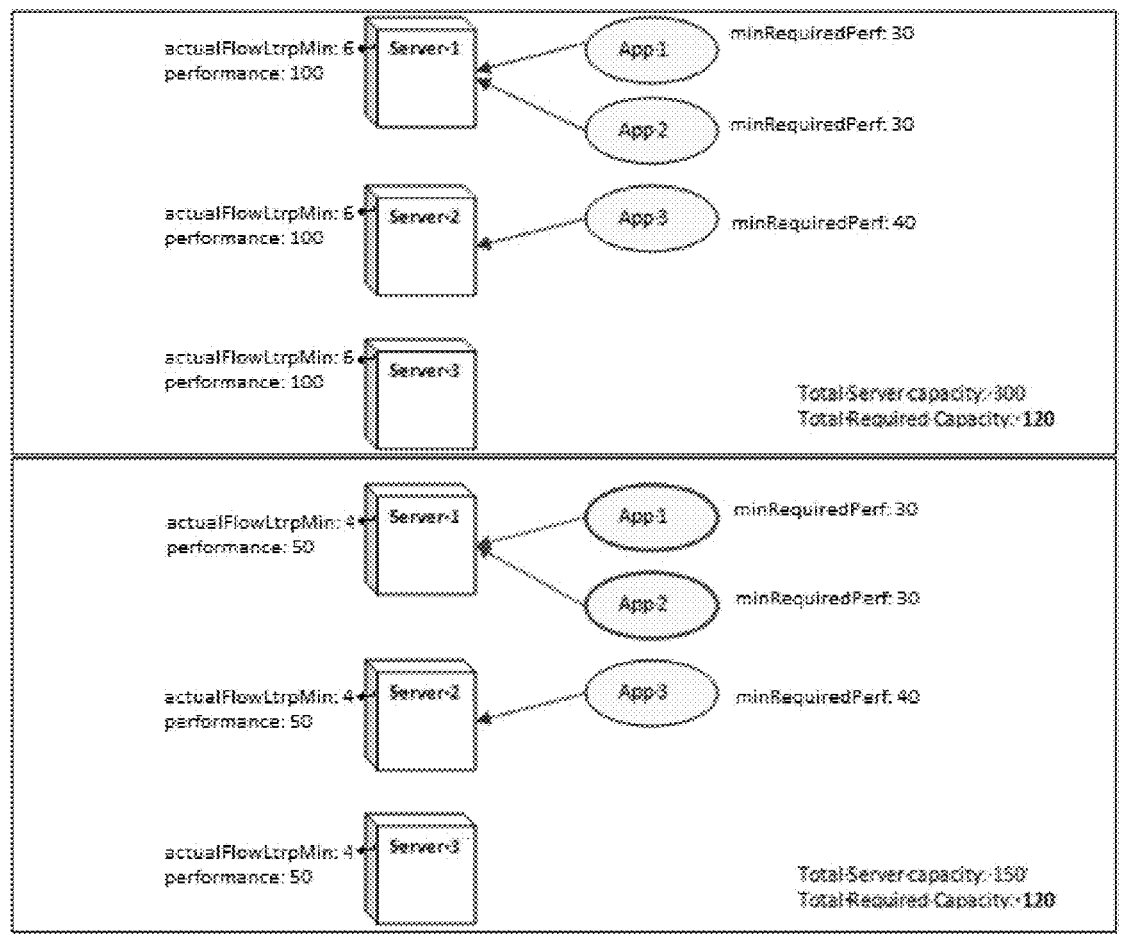
FIG. 21 depicts example of two states in separate diagrams, with the attribute values calculated via the inter-view Constraints.

FIG. 21 depicts the two states by separate diagrams, with the attribute values calculated via the inter-view Constraints.

When powered by the grid, the pump gets the full current it needs to send 6 Ltrs/min of water to each server. Hence, each server is able to function at full capacity as determined by the performance constraints. However when powered by the batter, the pumping rate comes down as the current available is less, and now the servers power down to avoid overheating. But now the applications are not able to function properly as they are not getting the performance they required.

Figure 22:
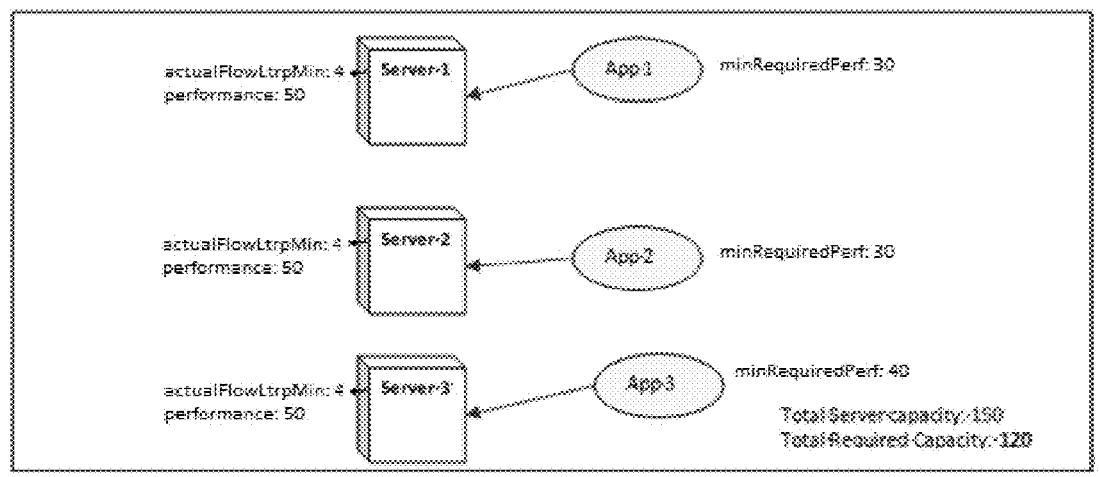
FIG. 22 depicts an example of a deployment configuration to satisfy performance constraints.

However, the Graphical User Interface Software Component may allow the architect to easily observe that the datacenter still has the required capacity because of Server 3. And he may now decide on a different deployment configuration that will satisfy the performance constraints, as depicted in FIG. 22.

Such analysis and design tasks are extremely challenging with existing tools, necessitating the Digital Tool as described above.

FIG. 5 depicts a Flow Chart with embedded use cases (cf. grey-colored rectangular chart boxes in the FIG. 5), which are substantially/mostly presented by "sequence charts" in FIGS. 6 to 12, to engineer software architectures of complex cyber-physical systems using the Digital Tool according to the FIG. 4. After the Start of the Engineering Process being referenced as Flow Chart State FCS-0 according to the FIG. 5, e.g. by a user of the Digital Tool, it is interrogated subsequently by the user in a first Flow Chart State FCS-1 whether there is an existing System Model accessible in the Graphical User Interface Software Component GUISC. If the answer is "NO", it is interrogated in a second Flow Chart State FCS-2 whether the user wants to create a new System Model or use an existing System Model. If he wants to create a new System Model (cf. corresponding CREATE-path of the Flow Chart in the FIG. 5), such a System Model is created in a third Flow Chart State FCS-3, which refers to a first "sequence chart"-based use case according to FIG. 6.

Figure 6:
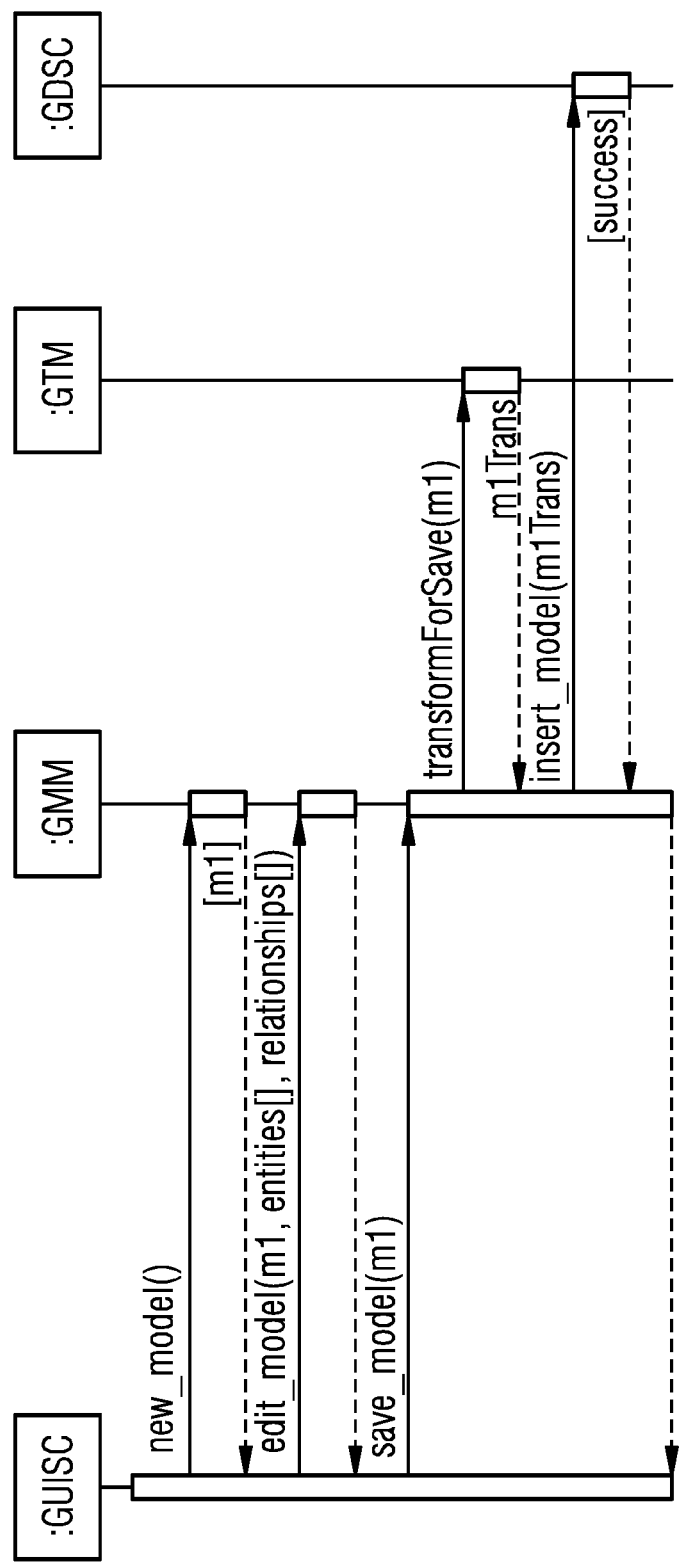
FIG. 6 depicts a first "sequence chart"-based use case of creating a new "System Model".

The sequence chart in the FIG. 6 show how the System Model is created. In a first act, the user requests the creation of a new System Model in the Graphical User Interface Software Component GUISC. In a second act, this request is transferred to the Graph-based Modeling Module GMM that creates the new System Model (m1) and returns the created System Model to the Graphical User Interface Software Component GUISC, which displays it to the user. In a third act, the user edits the System Model (e.g., adding new Entities and relationships) and sends the edited System Model to the Graph-based Modeling Module GMM via the Graphical User Interface Software Component GUISC. In a fourth act, the user persists the System Model by requesting the Graphical User Interface Software Component GUISC to save the System Model, which passes the request to the Graph-based Modeling Module GMM. In a fifth act, the Graph-based Modeling Module GMM uses the Graph Transformation Module GTM to transform the System Model (m1) into a format, the System Model (m1Trans), suitable for the storage in the Graph Database Software Component GDBSC. In a sixth act, the transformed System Model (m1Trans) is inserted into the Graph Database Software Component GDBSC.

Once the new System Model is created in the third Flow Chart State FCS-3, it is interrogated in a fourth Flow Chart State FCS-4 whether there are any changes to make in the System Model.

Back on to the second Flow Chart State FCS-2 interrogating whether a new System Model may be created or whether an existing System Model is used. If the user wants to use an existing System Model (cf. corresponding EXISTING-path of the Flow Chart in the FIG. 5), the user is requested in a fifth Flow Chart State FCS-5 whether he wants to load an existing System Model from the Graph Database Software Component GDBSC or to import an existing System Model from the External Tool ET, ET1, ET2. In the case he wants to load the System Model from the Graph Database Software Component GDBSC (cf. corresponding LOAD-path of the Flow Chart in the FIG. 5), the System Model is loaded from the Graph Database Software Component GDBSC in a sixth Flow Chart State FCS-6, which refers to a second "sequence chart"-based use case according to FIG. 7.

Figure 7:
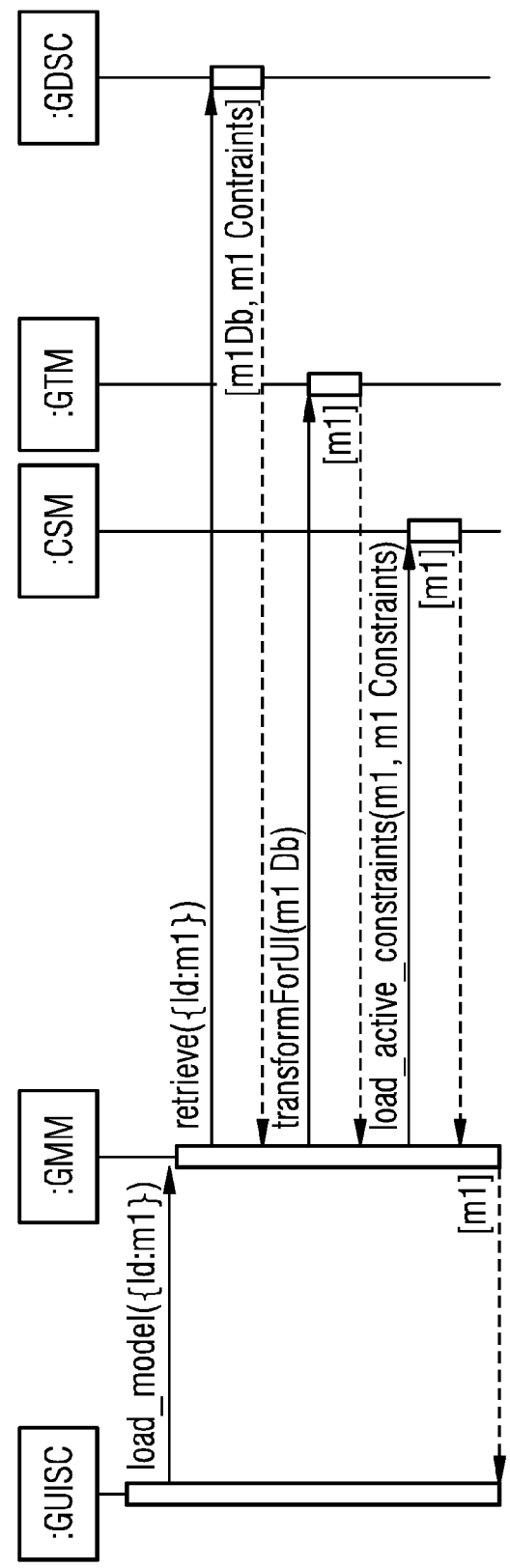
FIG. 7 depicts a second "sequence chart"-based use case of loading a "System Model" from a Graph Database Software Component.

The sequence chart in the FIG. 7 depicts the use case of loading a System Model from the Graph Database Software Component GDBSC. In a first act, the user specifies an identifier (id) of a System Model (m1) (cf. FIG. 7 (id:m1)) for the Engineering Process to be loaded in the Graphical User Interface Software Component GUISC and transfers a corresponding request to the Graph-based Modeling Module GMM. In a second act, the Graph-based Modeling Module GMM locates the relevant System Model and associated Constraints in the Graph Database Software Component GDBSC and retrieves the relevant System Model stored in the Graph Database Software Component GDBSC. In a third act, the Graph-based Modeling Module GMM uses the Graph Transformation Module GTM to transform the stored and retrieved System Model into a format, the System Model (m1) suitable for the Graph User Interface Software Component GUISC. In a fourth act, the Graph-based Modeling Module GMM requests the loading of Constraints in the Constrain Solver Module CSM, so that violations may be detected on editing. In a fifth act, the processed System Model (m1) is shown to the user via the Graph User Interface Software Component GUISC.

When the processed System Model is loaded, the Engineering Process goes on according to the Flow Chart of the FIG. 5 in the still known (as described above) fourth Flow Chart State FSC-4.

Back on to the fifth Flow Chart State FSC-5 checking whether the user wants to load an existing System Model from the Graph Database Software Component GDBSC or to import an existing System Model from the External Tool ET, ET1, ET2. If the users decision is to import an existing System Model from the External Tool ET, ET1, ET2 (cf. corresponding IMPORT-path of the Flow Chart in the FIG. 5), an existing System Model is imported from the External Tool ET, ET1, ET2 in a seventh Flow Chart State FSC-7, which refers to a third "sequence chart"-based use case according to FIG. 8.

Figure 8:
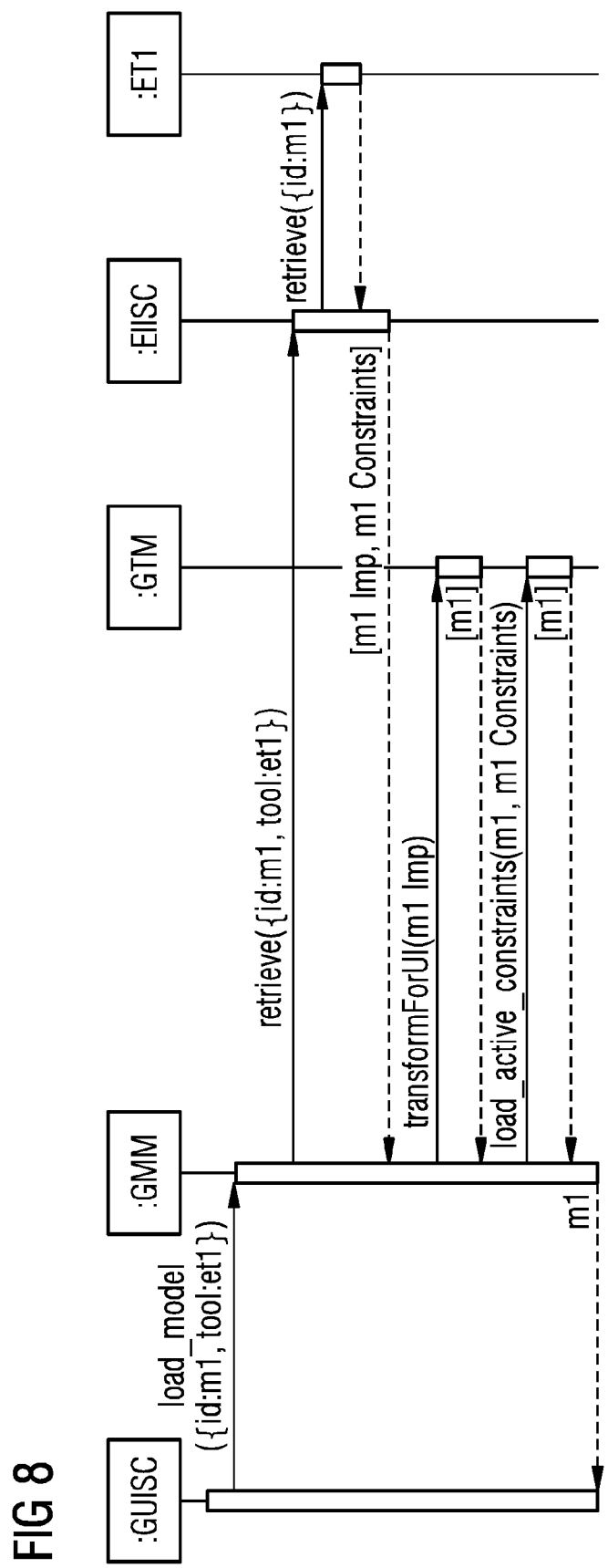
FIG. 8 depicts a third "sequence chart"-based use case of loading a "System Model" from an External Tool.

The sequence chart in the FIG. 8 depicts the use case of loading a System Model from the External Tool ET, e.g., the first Tool ET1. This sequence chart overlaps substantially with that of the FIG. 7, but differs in some aspects. In a first act, the user specifies an identifier (id) of a System Model (m1) and an identifier (tool) of an External Tool (ET1)(cf. FIG. 8 (id:m1, tool:et1)) for the Engineering Process to be loaded in the Graphical User Interface Software Component GUISC and transfers a corresponding request to the Graph-based Modeling Module GMM. In a second act, the Graph-based Modeling Module GMM uses the Exporting/Importing Interface Software Component EIISC for locating the relevant System Model and associated Constraints in the External Tool ET1 and retrieves via the Exporting/Importing Interface Software Component EIISC the relevant System Model stored in the External Tool ET1. In a third act, the Graph-based Modeling Module GMM uses the Graph Transformation Module GTM to transform the stored and retrieved System Model into a format, the System Model (m1), suitable for the Graph User Interface Software Component GUISC. In a fourth act, the Graph-based Modeling Module GMM requests the loading of Constraints in the Constrain Solver Module CSM, so that violations may be detected on editing. In a fifth act, the processed System Model (m1) is shown to the user via the Graph User Interface Software Component GUISC.

When here too the processed System Model is loaded, the Engineering Process goes on according to the Flow Chart of the FIG. 5 in the still known (as described above) fourth Flow Chart State FSC-4.

Back on to the first Flow Chart State FSC-1 checking whether there is an existing System Model accessible in the Graphical User Interface Software Component GUISC. However, if the answer is "YES", the Engineering Process goes on according to the Flow Chart of the FIG. 5 in the still known (as described above) fourth Flow Chart State FSC-4.

Back on to the fourth Flow Chart State FSC-4 checking in the System Model whether there are any changes to make. If the answer is "YES", it is possible to edit the System Model by (a) adding Entities/Relations, (b) adding Constraints and/or (c) applying Templates in a eighth Flow Chart State FCS-8, which refers regarding (b) to a fourth "sequence chart"-based use case according to FIG. 9 and regarding (c) to a fifth "sequence chart"-based use case according to FIG. 10. A "sequence chart"-based use case for (a) adding Entities/Relations is not shown explicitly.

Figure 9:
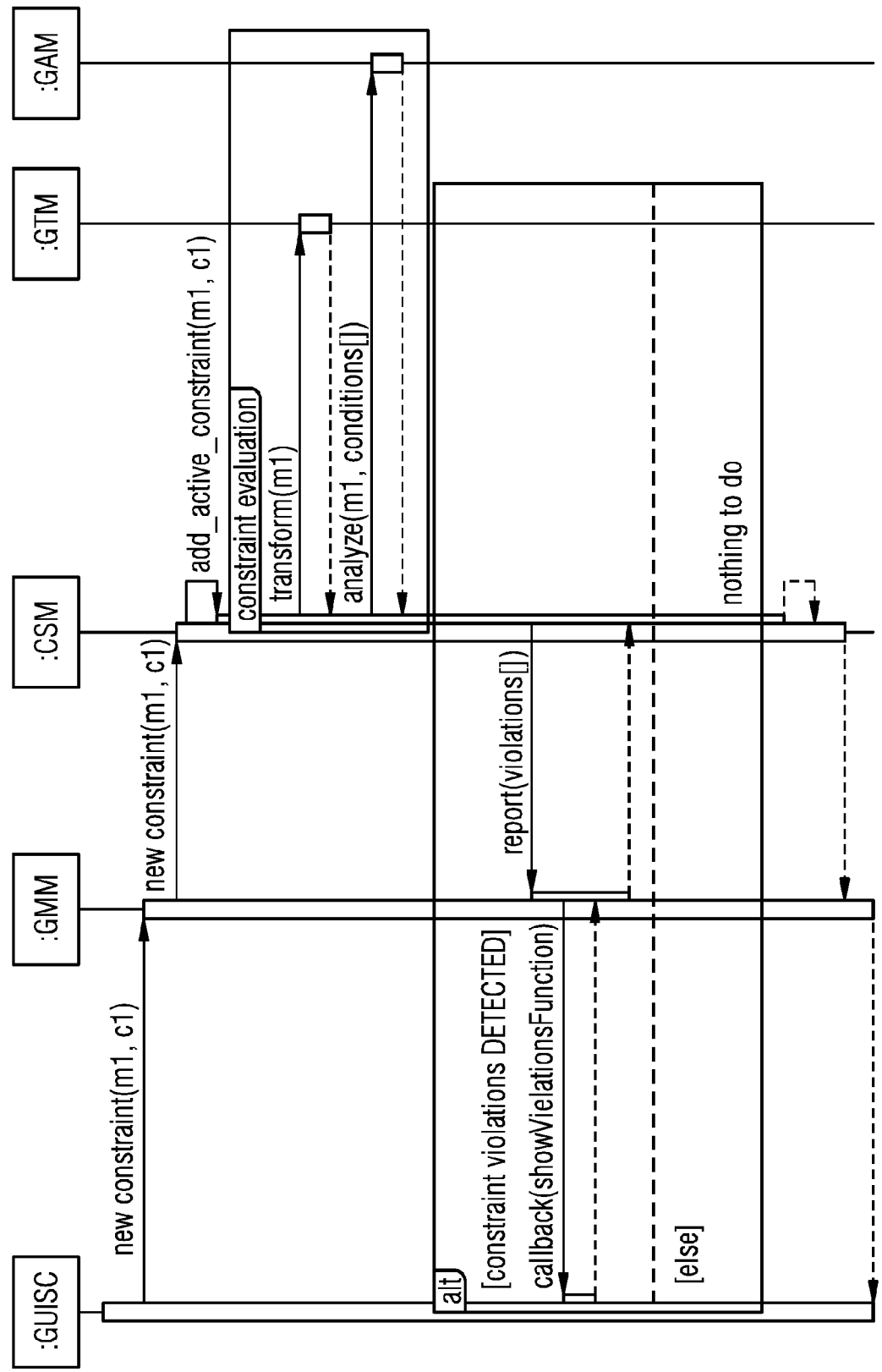
FIG. 9 depicts a fourth "sequence chart"-based use case of adding new Constraints.

The sequence chart in the FIG. 9 depicts the use case of adding new Constraints. In a first act, the user specifies a new Constraint (c1) for a System Model (m1) for the Engineering Process to be loaded in the Graphical User Interface Software Component GUISC. In a second act, the Graphical User Interface Software Component GUISC passes the Constraint to the Graph-based Modeling Module GMM and in turn to the Constrain Solver Module CSM. In a third act, the Constraint is added to the list of active Constraints for the System Model (m1) maintained by the Constrain Solver Module CSM. In a fourth act, the new Constraint along with all other Constraints are re-evaluated by the Constrain Solver Module CSM. In fifth act, the System Model (m1) is transformed by the Graph Transformation Module GTM in order to perform Constraint-evaluation, whereby the Constraints are evaluated in cooperation with Graph Algorithms present in the Graph Analysis Module GAM. In a sixth act, if Constraint-violations are detected, Callback Functions are generated, which are passed back to the Graph User Interface Software Component GUISC to inform the user.

Figure 10:
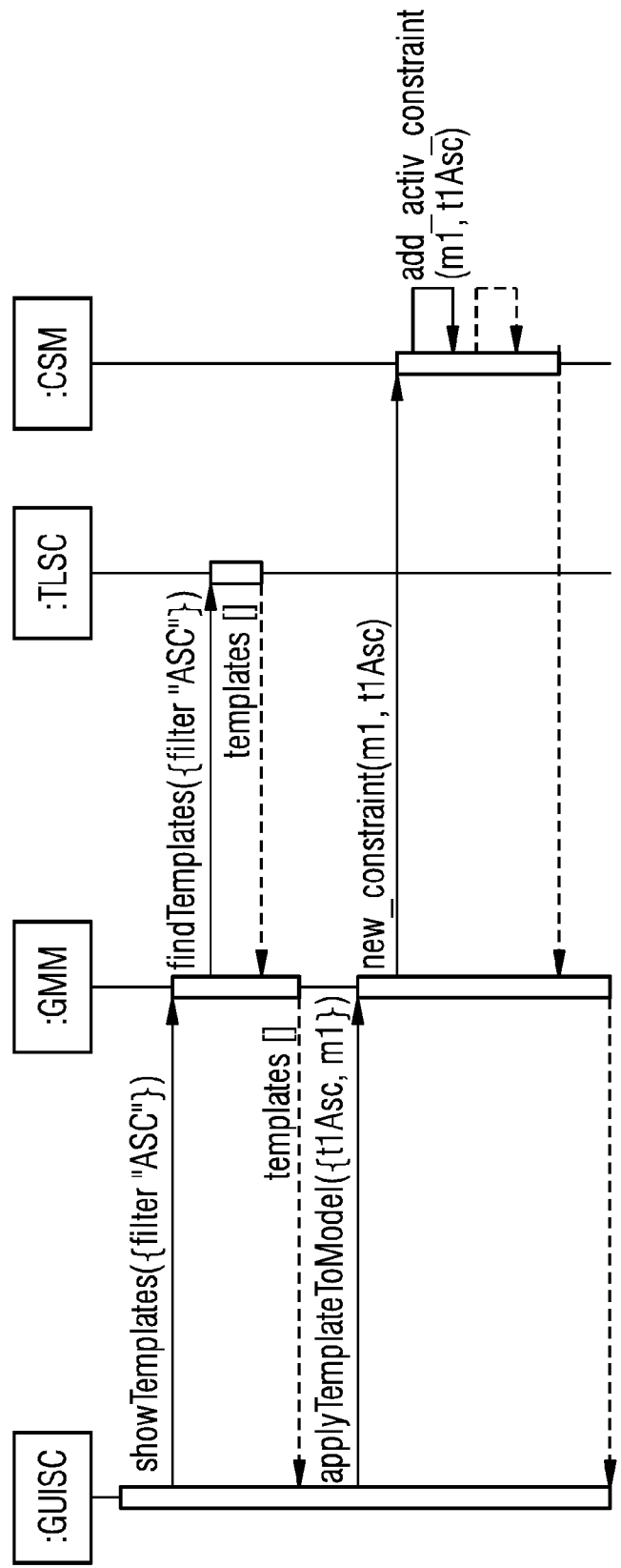
FIG. 10 depicts a fifth "sequence chart"-based use case of using Templates.

The sequence chart in the FIG. 10 depicts the use case of using/applying Templates. In a first act, the user requests a list of Templates in the Graphical User Interface Software Component GUISC filtered by some criteria. In a second act, the Graphical User Interface Software Component GUISC contacts/requests the Graph-based Modeling Module GMM for relevant Templates. In a third act, the Graph-based Modeling Module GMM retrieves Templates from the Template Library Software Component TLSC, which are transferred to the Graphical User Interface Software Component GUISC in order to show the requested list of Templates. In a fourth act, the user selects a Constraint (t1Asc) from the given list of Templates and applies it to an already loaded System Model (m1). In a fifth act, the Graph-based Modeling Module GMM indicates to the Constrain Solver Module CSM that the Constraint (t1Asc) is now an active Constraint to be evaluated for each change of the System Model (m1).

Figure 11:
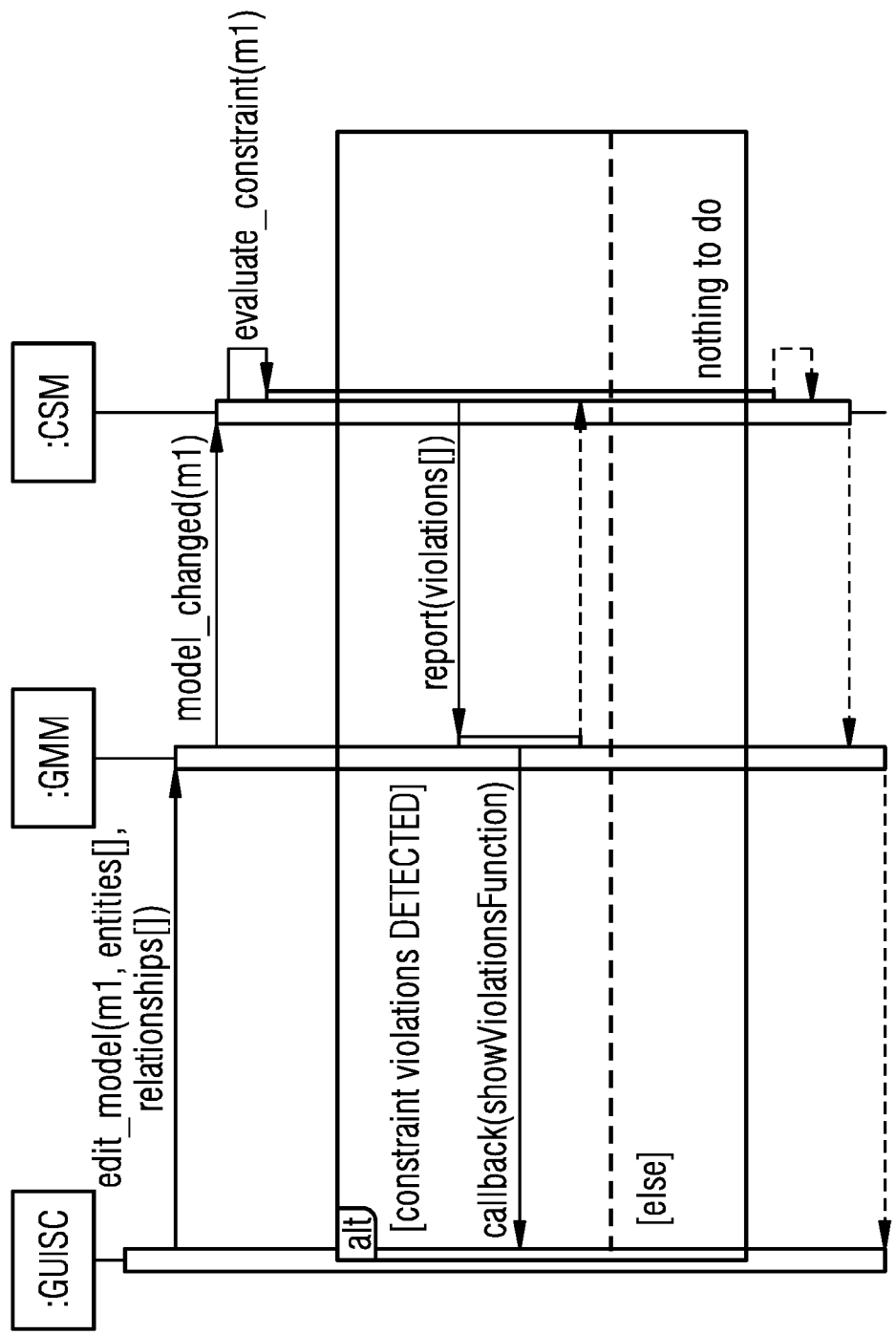
FIG. 11 depicts a sixth "sequence chart"-based use case of getting warned of invalid modifications lead to Constraint-violations.

Once the editing of the System Model is finished in the eighth Flow Chart State FCS-8, it is checked in a ninth Flow Chart State FCS-9 whether the user has been notified of Constraint-violations, which refers to a sixth "sequence chart"-based use case according to FIG. 11.

The sequence chart in the FIG. 11 depicts the use case of getting warned of invalid modifications lead to Constraint-violations. In a first act, the user modifies a System Model such that one of the active Constraints is violated. In a second act, the Graph-based Modeling Module GMM notifies the Constrain Solver Module CSM of a System Model Update. In a third act, the Constrain Solver Module CSM evaluates all the active Constraints, determines the violated constraint and reports the Constraint-violation (as described above according to the sequence chart shown in the FIG. 9).

If the answer in the ninth Flow Chart State FCS-9 is "YES", the Engineering Process goes back to the eighth Flow Chart State FCS-8 to edit/change the System Model accordingly by (a) adding Entities/Relations, (b) adding Constraints and/or (c) applying Templates (cf. the description above concerning the Flow Chart State FCS-8 referring to the fourth "sequence chart"-based use case according to the FIG. 9 and the fifth "sequence chart"-based use case according to the FIG. 10).

However, if the answer in the ninth Flow Chart State FCS-9 is "NO", the Engineering Process goes according to the Flow Chart of the FIG. 5 back to the still known (as described above) fourth Flow Chart State FSC-4.

Back on now to the fourth Flow Chart State FSC-4 checking whether there are any changes to make in the System Model. If the answer is now "NO", it is interrogated in a tenth Flow Chart State FCS-10 whether there are issues to understand/check using Queries. If the answer in the tenth Flow Chart State FCS-10 is "YES", it is possible to execute Queries and to review Results in an eleventh Flow Chart State FCS-11, which refers to a seventh "sequence chart"-based use case according to FIG. 12.

Figure 12:
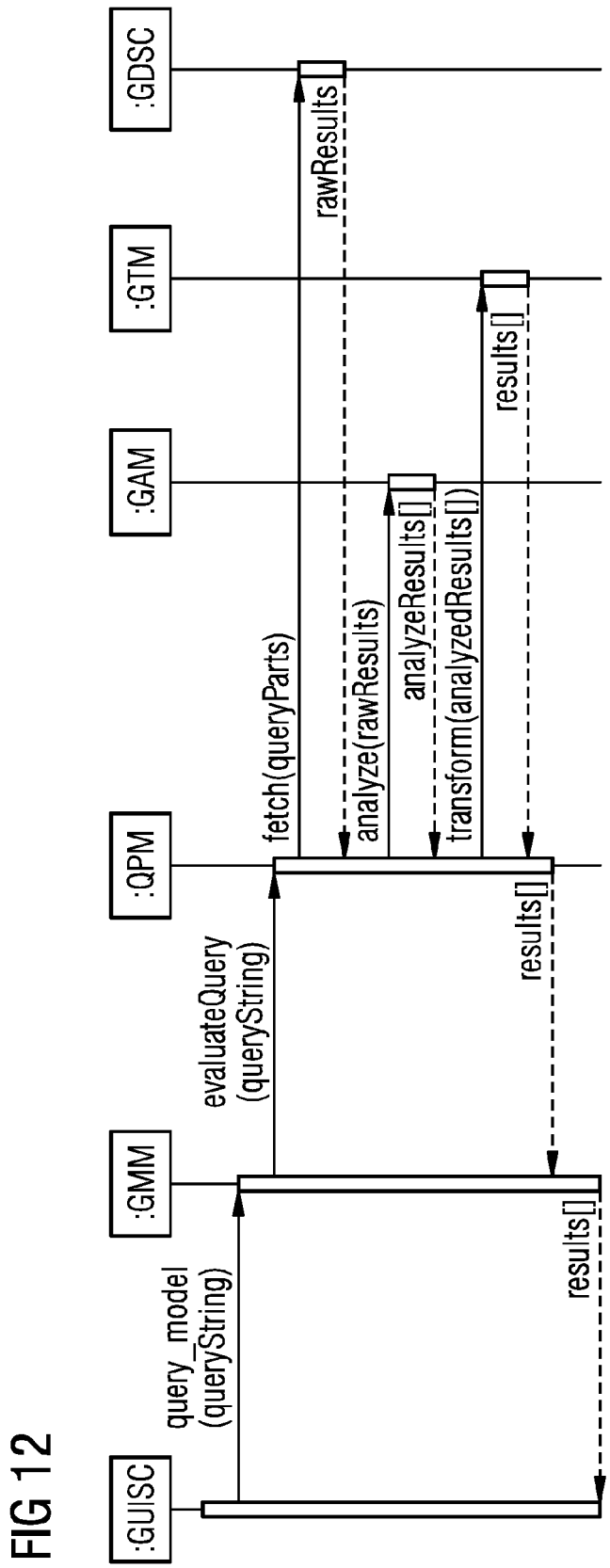
FIG. 12 depicts a seventh "sequence chart"-based use case of inputting Queries and receiving Results.

The sequence chart in the FIG. 12 depicts the use case of executing Queries and reviewing Results (Queries and Results). In a first act, the user constructs a Query according to a Query-Language in the Graphical User Interface Software Component GUISC, which requests the Graph-based Modeling Module GMM for Results. In a second act, the Graph-based Modeling Module GMM passes the request to the Query Processor Module QPM, which parses the Query, creates an execution plan and executes the plan on the Graph Data available in the Graph Database Software Component GDSC. In a third act, the Query Processor Module QPM fetches the raw results from the Graph Database Software Component GDSC for various parts of the Query. In a fourth act, the Query Processor Module QPM uses algorithms in the Graph Analysis Module GAM to create analyzed results according to the execution plan. In a fifth act, the Query Processor Module QPM uses the Graph Transformation Module GTM to transform the analyzed results to a set of Results in a format required by the Graph-Based Modeling Module GMM. In a sixth act, the Graph-based Modeling Module GMM transferred the Results of the execution to the Graphical User Interface Software Component GUISC, where the Results are presented to the user.

When the execution of the Queries and the review of the Results are finished, the Engineering Process goes back according to the Flow Chart of the FIG. 5 in the still known (as described above) fourth Flow Chart State FSC-4.

Back on to the tenth Flow Chart State FCS-10 using Queries to understand/check issues. If the answer in the tenth Flow Chart State FCS-10 is "NO", it is interrogated whether System Models may be exported for analysis by External Tools, such as the Tools ET, ET1, ET2, in an twelfth Flow Chart State FCS-12. If the answer in the twelfth Flow Chart State FCS-12 is "YES", an interaction with the External Tool, e.g., exporting System Models for analysis/evaluation takes place in an thirteenth Flow Chart State FCS-13, which refers to a eighth "sequence chart"-based use case according to FIG. 13.

Figure 13:
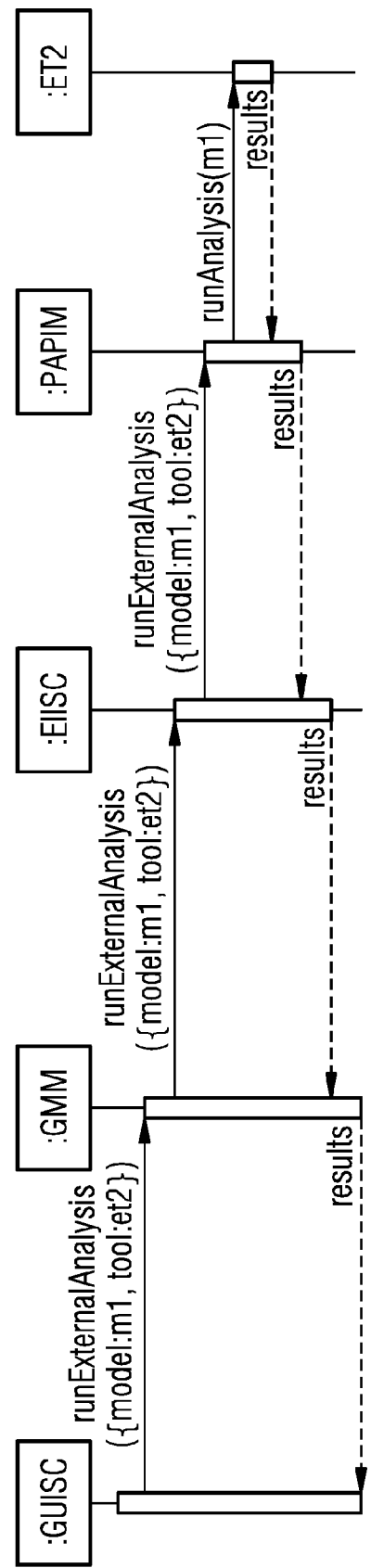
FIG. 13 depicts a eighth "sequence chart"-based use case of interacting with External Tools.

The sequence chart in the FIG. 13 depicts the use case of interaction with the External Tool, e.g., exporting System Models for analysis/evaluation, (Interacting with External Tools). In a first act, the user indicates via the Graphical User Interface Software Component GUISC that an external analysis has to be done by the External Tool ET2 on a loaded System Model (cf. FIG. 13 (id:m1, tool:et2)) and this request is transferred to the Graph-based Modeling Module GMM. In second act, the Graph-based Modeling Module GMM passes this request to the Exporting/Importing Interface Software Component EIISC, which is able to connect interactively to the second External Tool ET2 via the "Plug-in Application Programming Interface Module" PAPIM to run the analysis. Finally, in a third act, results obtained by the Exporting/Importing Interface Software Component EIISC are successively passed via the Graph-based Modeling Module GMM to the Graphical User Interface Software Component GUISC, where the Results are presented to the user.

Once the interaction with the External Tool, e.g., exporting System Models for analysis/evaluation, is finished in the thirteenth Flow Chart State FCS-13 the Engineering Process goes back according to the Flow Chart of the FIG. 5 in the still known (as described above) fourth Flow Chart State FSC-4.

Back on to the twelfth Flow Chart State FCS-12 interrogating whether System Models may be exported for analysis by External Tools, such as the Tools ET, ET1, ET2. If the answer in the twelfth Flow Chart State FCS-12 is "NO", the Engineering Process ends in fourteenth Flow Chart State FCS-14 according to the Flow Chart of the FIG. 5.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for engineering software architectures with architectural aspects of a complex cyber physical system being captured in views comprising entities being related to each other and being related across various views, the method comprising:
   a) modeling, by graph-based modeling, the entities to be under analysis as nodes and relations between the entities as edges, wherein either no attribute or at least one attribute is assigned to the nodes and the edges, thereby mapping user input concepts into the nodes and the edges with the attributes and storing modeled graph data;
   b) specifying properties desired of the entities as constraints having to be satisfied;
   c) inputting at least one query and at least one constraint for the graph-based modeling;
   d) evaluating the at least one constraint by transforming one graph into at least one other graph and using provided implementations of graph algorithms;
   e) processing the at least one query against a current set of the stored graph data by using a graph-query-language;
   f) evaluating the inputted constraints on a set of nodes and edges against the current set of the stored graph data and providing on detecting constraint-violations call-back functions specifying locations of the constraint-violations; and g) editing results of at least one of acts (a), (d), (e), or (f) for at least one of visualizing and outputting.

2. The method according to claim 1, characterized by enabling defined by a template domain-specific information-based reuse of at least one of common queries, constraints, or architectural views.

3. The method according to claim 2, wherein the template is a view-template with a parameterized version of an actual view, the view-template comprising a graph-based description of at least one of what view-elements such as the nodes and edges to be visualized are, what the relations between the view-elements are, and how to layout and interact with the view-elements.

4. The method according to claim 2, wherein the template is a constraint-template comprising expressions containing variables that are substitutable with actual stored data to reuse the constraint-structure.

5. The method according to claim 2, wherein the template is a query-template comprising expressions containing variables that are substitutable with actual stored data to reuse the query-structure.

6. The method according to claim 1, further comprising enabling at least one of exporting input-data for external analysis/evaluation to and importing output-data of the external analysis/evaluation or importing external data from a first external tool for bulk export/import and a second external tool for interactive export/import.

7. The method according to claim 6, wherein the enabling of the exporting- and importing-functionality for the interactive export/import uses a plugin application programming interface for the interactive usage.

8. A non-transitory computer-readable storage medium having stored thereon a computer program for engineering software architectures with architectural aspects of a complex cyber physical system being captured in views comprising entities being related to each other and being related across various views, the computer program comprising:
   a model management software component;
   a graphical user interface software component; and
   a graph database software component, the model management software component, the graphical user interface software component, and the graph database software component forming a functional unit, wherein:
   a) a graph-based modeling module of the model management software component functionally associated with the graphical user interface software component and the graph database software component, wherein the entities to be under analysis as nodes and relations between the entities as edges are modeled, whereby to both the nodes and the edges either no attribute or at least one attribute is assigned, thereby mapping user input concepts into the nodes and the edges with the attributes and modeled graph data are stored in the graph database software component;
   b) the graph-based modeling module properties desired of the entities as constraints, which have to be satisfied, are specified;
   c) the graphical user interface software component functionally associated with the graph-based modeling module at least one query and at least one constraint used by the graph-based modeling module for the graph-based modeling is inputted;
   d) a graph transformation module and a graph analysis module of the model management software component functionally associated with each of the graph-based modeling module and the graph database software component the at least one constraint is evaluated by transforming one graph into at least one other graph and using implementations of graph algorithms provided by the graph analysis module;
   e) a query processor module of the model management software component functionally associated with each of the graph-based modeling module, the graph transformation module, the graph analysis module, and the graph database software component and, using a graph-query-language, the at least one query is processed against a current set of the graph data in the graph database software component;
   f) a constraint solver module of the model management software component functionally associated with each of the graph-based modeling module, the graph transformation module, the graph analysis module, and the graph database software component the inputted constraints on a set of nodes and edges are evaluated against the current set of the graph data in the graph database software component and on detecting constraint-violations callback functions specifying locations of the constraint-violations are provided; and
   g) an editing-module of the graphical user interface software component functionally associated with each of the graph-based modeling module, the query processor module, and the constraint solver module results of at least one of the previous actions according to (a), (d), (e) and (f) for at least one of visualizing and outputting.

9. The medium according to claim 8, wherein a template library software component is enabled, the template library software component being functionally associated with the model management software component forming a first functional sub-unit such that defined by a template domain-specific information-based reuse of at least one of common queries, constraints, and architectural views.

10. The medium according to claim 9, wherein the template library software component comprises view-templates with a parameterized version of an actual view containing a graph-based description of at least one of what view-elements to be visualized are, what the relations between the view-elements are, and how to layout and interact with the view-elements.

11. The medium according to claim 9, wherein the template library software component comprises constraint-templates comprising expressions containing variables that are substitutable with actual data in the graph database software component to reuse the constraint-structure.

12. The medium according to claim 9, wherein the template library software component comprises query-templates comprising expressions containing variables that are substitutable with actual data in the graph database software component to reuse the query-structure.

13. The medium according to claim 8, further comprising an exporting/importing interface software component functionally associated with the model management software component forming a second functional sub-unit such that at least one of exporting input-data for external analysis/evaluation to a first external tool for bulk export/import and a second external tool for interactive export/import, and importing output-data of the external analysis/evaluation or importing external data from the first external tool and the second external tool is enabled.

14. The medium according to claim 13, wherein the exporting/importing interface software component enabling the exporting- and importing-functionality comprises, for the interactive export/import, a plugin application programming interface module for the interactive usage.

15. The medium according to claim 8, wherein the computer program is designed as an Application software to run on a computer or a server.

16. The medium according to claim 8, wherein the computer program is stored on a storage media being insertable into a computer or a server or being part of the computer or the server.

17. The medium according to claim 8, wherein the computer program is stored as cloud-computing on at least one server.

\* \* \* \* \*